(12) United States Patent
Wu

(10) Patent No.: US 10,455,967 B2
(45) Date of Patent: Oct. 29, 2019

(54) CIRCULATOR COOKER

(71) Applicant: Anova Applied Electronics, Inc., San Francisco, CA (US)

(72) Inventor: Jeff Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 0 days.

(21) Appl. No.: 15/890,439

(22) Filed: Feb. 7, 2018

(65) Prior Publication Data

US 2018/0160841 A1 Jun. 14, 2018

Related U.S. Application Data

(63) Continuation of application No. 14/885,845, filed on Oct. 16, 2015, which is a continuation-in-part of application No. 13/935,971, filed on Jul. 5, 2013, now Pat. No. 9,687,104, and a continuation-in-part of application No. 14/491,961, filed on Sep. 19, 2014.

(60) Provisional application No. 61/764,984, filed on Feb. 14, 2013, provisional application No. 61/880,714, filed on Sep. 20, 2013.

(51) Int. Cl.
*A47J 27/10* (2006.01)
*H05B 3/80* (2006.01)

(52) U.S. Cl.
CPC ........... *A47J 27/10* (2013.01); *H05B 3/80* (2013.01)

(58) Field of Classification Search
CPC .................................. A47J 27/10; H05B 3/80
USPC ........................... 99/343, 348, 537; 426/231
See application file for complete search history.

(56) References Cited

U.S. PATENT DOCUMENTS

| 1,703,099 A | 2/1929 | Craddock |
| 1,864,149 A | 6/1932 | Rockwell |
| 2,140,315 A | 12/1938 | Dollinger |
| 3,114,154 A | 12/1963 | Laughlin |
| 3,270,661 A | 9/1966 | Juvan |
| 3,273,717 A | 9/1966 | Canterbury |
| D214,165 S | 5/1969 | Sesholtz |

(Continued)

FOREIGN PATENT DOCUMENTS

| CN | 102192597 | 9/2011 |
| CN | 103211494 A | 7/2013 |

(Continued)

OTHER PUBLICATIONS

Notice of Allowance for U.S. Appl. No. 14/727,431, dated Jun. 1, 2018, 8 pages.

(Continued)

*Primary Examiner* — Thien S Tran
(74) *Attorney, Agent, or Firm* — RatnerPrestia

(57) ABSTRACT

A sous-vide circulator cooker is disclosed. A sous-vide circulator cooker can include a controller located in a sealed housing. The controller configured to be communicatively coupled to an electronic input device, such as a smart phone or server, and be capable of receiving control instructions from the electronic input device. The sous-vide circulator cooker can also include a submersible pump connected to the sealed controller, an adjustable electrode to detect water level, a clamp enabling the device to be adjustably secured to a container such as a water chamber. The cooker can be used to cook food placed in water within the chamber by heating the water.

24 Claims, 14 Drawing Sheets

(56) References Cited

U.S. PATENT DOCUMENTS

| | | |
|---|---|---|
| 4,045,606 A | 8/1977 | Kalkowski |
| 4,099,406 A | 7/1978 | Fulkerson |
| 4,612,949 A | 9/1986 | Henson |
| 4,817,217 A | 4/1989 | Lively |
| 4,933,527 A | 6/1990 | Edamura |
| 4,993,593 A | 2/1991 | Fabiano |
| 5,146,840 A | 9/1992 | Hedenberg |
| 5,317,134 A | 5/1994 | Edamura |
| 5,321,229 A | 6/1994 | Holling |
| 5,336,401 A | 8/1994 | Tu |
| 5,368,384 A | 11/1994 | Duncan |
| 5,372,422 A | 12/1994 | Dubroy |
| 5,401,401 A | 3/1995 | Hickok |
| 5,412,171 A | 5/1995 | Yahav |
| 5,516,208 A | 5/1996 | Givant |
| 5,542,344 A | 8/1996 | Koether |
| 6,079,486 A | 6/2000 | Cennamo |
| 6,113,258 A | 9/2000 | Ardent |
| 6,286,990 B1 | 9/2001 | De Zuazo Torres |
| 6,539,842 B1 | 4/2003 | Chapman |
| 6,604,917 B2 | 8/2003 | Casper |
| 6,763,879 B1 | 7/2004 | Macheske et al. |
| 6,796,220 B2 | 9/2004 | Lee |
| 6,957,111 B2 | 10/2005 | Zhu et al. |
| 6,962,290 B2 | 11/2005 | Kwon |
| 7,026,929 B1 | 4/2006 | Wallace |
| 8,087,822 B2 | 1/2012 | Peng |
| 8,122,815 B2 | 2/2012 | Wolfe |
| 8,172,451 B2 | 5/2012 | Li |
| 8,218,402 B2 | 7/2012 | Lewis |
| 8,469,678 B2 | 6/2013 | Preston |
| 9,642,494 B1* | 5/2017 | Brun ................ A47J 43/044 |
| 2004/0221736 A1 | 11/2004 | Park |
| 2004/0223404 A1 | 11/2004 | Hughes |
| 2005/0223910 A1 | 10/2005 | Hankinson |
| 2006/0239113 A1* | 10/2006 | Harris ............ A47J 43/0705 366/129 |
| 2008/0000357 A1 | 1/2008 | Yang et al. |
| 2008/0066624 A1 | 3/2008 | Taylor |
| 2008/0136581 A1 | 6/2008 | Heilman |
| 2008/0218493 A1 | 9/2008 | Patten et al. |
| 2008/0260557 A1 | 10/2008 | Austin |
| 2009/0087534 A1 | 4/2009 | McLemore |
| 2009/0093983 A1 | 4/2009 | Trafford |
| 2009/0120301 A1 | 5/2009 | Severnak |
| 2009/0153490 A1 | 6/2009 | Nymark |
| 2009/0241344 A1* | 10/2009 | Mastroianni ............ A47J 25/00 30/114 |
| 2010/0090656 A1 | 4/2010 | Shearer |
| 2010/0154656 A1 | 6/2010 | Yamamoto |
| 2010/0199854 A1 | 8/2010 | Homme |
| 2011/0070340 A1 | 3/2011 | Pechaigner |
| 2011/0088564 A1 | 4/2011 | Bonsell |
| 2011/0117259 A1 | 5/2011 | Storek |
| 2011/0185915 A1 | 8/2011 | Eades |
| 2011/0186283 A1* | 8/2011 | Preston ................ B01L 7/02 165/287 |
| 2011/0217439 A1 | 9/2011 | Morandotti |
| 2012/0053747 A1 | 3/2012 | Tanaka et al. |
| 2013/0091883 A1 | 4/2013 | Perez |
| 2013/0112683 A1 | 5/2013 | Hegedis |
| 2013/0220143 A1* | 8/2013 | Fetterman ........... A47J 36/2405 99/330 |
| 2013/0302483 A1 | 11/2013 | Riefenstein |
| 2014/0026762 A1 | 1/2014 | Riefenstein |
| 2014/0208957 A1 | 7/2014 | Imai |
| 2014/0260998 A1 | 9/2014 | Pearson |
| 2014/0373723 A1* | 12/2014 | Vestreli .................. A47J 31/52 99/285 |
| 2015/0064314 A1 | 3/2015 | Manuel |
| 2015/0257574 A1 | 9/2015 | Hoare |
| 2015/0265090 A1 | 9/2015 | Pennella |
| 2015/0289544 A1 | 10/2015 | Mendonça Vilela Pinto Ferreira |
| 2015/0335192 A1 | 11/2015 | Plazarte |
| 2016/0083048 A1 | 3/2016 | Munsch |
| 2016/0198883 A1 | 7/2016 | Wang |

FOREIGN PATENT DOCUMENTS

| | | |
|---|---|---|
| EP | 2354738 | 8/2011 |
| EP | 2407703 | 1/2012 |
| GB | 2260002 | 3/1993 |
| JP | 63196984 | 12/1988 |
| JP | 2006334208 | 12/2006 |
| JP | 2008043502 | 2/2008 |
| JP | 2014001870 A | 1/2014 |
| KR | 20120049118 | 5/2012 |
| WO | 0152478 | 7/2001 |
| WO | 2004008923 | 1/2004 |
| WO | 2012156890 | 11/2012 |
| WO | 2014019018 | 2/2014 |

OTHER PUBLICATIONS

Notice of Allowance for U.S. Appl. No. 14/727,444, dated May 22, 2018, 7 pages.
Notice of Allowance for U.S. Appl. No. 14/727,402, dated Jul. 2, 2018, 6 pages.
European Communication Pursuant to Article 94(3) EPC for European Application No. 15170175.2, dated Jun. 8, 2018, 6 pages.
Chinese Office Action for Chinese Application No. 201510293958.9, dated Apr. 25, 2018, including English translation, 10 pages.
Final Office Action for U.S. Appl. No. 14/727,402, dated Apr. 20, 2018, 15 pages.
Australian Examination Report for Australian Application No. 2014200334, dated Mar. 20, 2018, 4 pages.
Australian Examination Report for Australian Application No. 2014293183, dated Oct. 4, 2017, 3 pages.
Chinese Office Action for Chinese Application No. 201480051964.7, dated Sep. 25, 2017, 11 pages.
Entire patent prosecution history of U.S. Appl. No. 14/885,845, filed Oct. 16, 2015, entitled, "Circulator Cooker."
European Communication for European Application No. 15192763.9, dated Mar. 23, 2018, 4 pages.
Extended European Search for European Application No. 15170176.0, dated Sep. 21, 2015, 5 pages.
Extended European Search Report for European Application No. 15170168.8, dated Sep. 23, 2015, 4 pages.
Extended European Search Report for European Application No. 15170175.2, dated Sep. 21, 2015.
Extended European Search Report dated Sep. 24, 2015, European Application No. 15170165.3, 5 pages.
Final Office Action for U.S. Appl. No. 14/727,402, dated Apr. 20, 2017, 8 pages.
Final Office Action for U.S. Appl. No. 14/885,845, dated Aug. 16, 2017, 10 pages.
Non Final Office Action for U.S. Appl. No. 14/491,961, dated Apr. 10, 2018, 8 pages.
Non Final Office Action for U.S. Appl. No. 14/491,961, dated Sep. 1, 2017, 10 pages.
Non Final Office Action for U.S. Appl. No. 14/727,402, dated Dec. 14, 2017, 12 pages.
Notice of Allowance for U.S. Appl. No. 14/491,961, dated Jan. 22, 2018, 10 pages.
Notice of Allowance for U.S. Appl. No. 14/727,431, dated Feb. 14, 2018, 9 pages.
Notice of Allowance for U.S. Appl. No. 14/727,431, dated Sep. 29, 2017, 8 pages.
Notice of Allowance for U.S. Appl. No. 14/727,444, dated Sep. 5, 2017, 5 pages.
Notification of Reason for Refusal dated Mar. 31, 2015, in Japanese patent Application No. 2014-025539.
International Search Report and Written Opinion of the International Searching Authority for International Application No. PCT/US2014/047838, dated Jan. 21, 2015.

(56) References Cited

OTHER PUBLICATIONS

J. Kenji Lopez-Alt: "Is the Nomiku Portable Sopus-Vide Cooker the Solution We're Looking for?", Serious Eats, Jun. 28, 2012; 2 pages, downloaded at http://www/seriouseats.com/2012/06/is-the-nomiku-portable-sous-vide-cooker-the-s.html.
News Anova INc. Water Bath Company, May 7, 2014, 1 page, downloaded at http://www.waterbaths.com/news. html.
Studio Kitchen; "Anova Immersion Circulator", May 8, 2014, 8 pp, downloaded at http//www.studiokitchen.com/studio-kitchen/anova-immersion-circulator.
European Patent Office Extended Search Report dated May 14, 2014, for European Patent Application No. EP 14154528.2, 8 pages.
Chinese Office Action for Chinese Application No. 20150293958.9, dated Aug. 10, 2018 with translation, 8 pages.
Australian Examination Report for Australian Application No. 2015202985, dated Sep. 14, 2018, 4 pages.
Final Office Action for U.S. Appl. No. 14/191,961, dated Jul. 16, 2018, 8 pages.
Non Final Office Action for U.S. Appl. No. 14/907,533, dated Aug. 9, 2018, 24 pages.
Non Final Office Action for U.S. Appl. No. 14/885,845, dated Aug. 27, 2018, 33 pages.
Japanese Notice of Reasons for Refusal for Japanese Application No. 2015-111598, dated May 14, 2019 with translation, 8 pages.
Australian Examination Report to Australian Application No. 2015202981, dated May 21, 2019, 4 pages.
Final Office Action for U.S. Appl. No. 14/885,845, dated Mar. 6, 2019, 33 pages.
Australian Examination Report for Australian Application No. 2015202982, dated Sep. 3, 2019, 5 pages.
Australian Examination Report for Australian Application No. 2015202983, dated Sep. 3, 2019, 4 pages.

* cited by examiner

CIRCULATOR COOKER

CROSS-REFERENCE TO RELATED APPLICATION

This application is a continuation of U.S. patent application Ser. No. 14/885,845, filed Oct. 16, 2015. U.S. patent application Ser. No. 14/885,845 is a continuation-in-part of U.S. patent application Ser. No. 13/935,971, filed Jul. 5, 2013, now U.S. Pat. No. 9,687,104, issued on Jun. 27, 2017, and is a continuation-in-part of U.S. patent application Ser. No. 14/491,961, filed Sep. 19, 2014. U.S. patent application Ser. No. 14/885,845 also claims priority to U.S. Provisional Application No. 61/764,984, filed on Feb. 14, 2013 and to U.S. Provisional Application No. 61/880,714, filed Sep. 20, 2013. The entire contents of each of these applications are expressly incorporated herein by reference.

FIELD OF TECHNOLOGY

The present disclosure relates generally to food cooking devices, and more specifically, to a precision temperature control water heater and water circulator appliance for cooking food in water baths.

BACKGROUND

Sous-vide is a method of cooking food sealed in airtight plastic bags in a water bath for longer than conventional cooking times at an accurately regulated temperature much lower than temperatures used for conventional cooking, typically around 55° C. (131° F.) to 60° C. (140° F.) for meats and higher for vegetables. Current sous-vide circulators tend to be designed like scientific equipment consisting of an AC motor above the water and shaft attached to a submersed impeller that agitates or pumps water.

SUMMARY

Several definitions that apply throughout this document will now be presented. "Circulating" means moving, pumping, agitating, blending, mixing, and the like of one or more fluids. Hence a "circulator" is a device, which is configured to provide such circulation to a cooking fluid. "Fluids" will be understood to comprise liquids. "Coupled" is defined as connected, whether directly or indirectly through intervening components and is not necessarily limited to physical connections. Coupled devices can be devices that are in signal communication with one another; that is, communicatively coupled to one another. "Connected" means directly connected or indirectly connected. "Sealed" can mean to make fluid passage resistant, hermetically sealed, mechanically sealed or otherwise make substantially imperious to air and water.

Broadly speaking, this disclosure relates to sous-vide circulator cookers for home sous-vide cooking. The disclosed devices are particularly suited for use in home kitchens; however, the devices are not limited to home kitchens and can be used in commercial environments.

The terms sous-vide cooker, sous-vide cooking device, circulator cooker, fluidic temperature control device, and cooker are used interchangeably throughout this specification and each refers to a device configured to cook food in a temperature controlled water bath.

In at least one embodiment, a fluidic temperature control device for sous-vide cooking can have one or more turn-able or rotatable information displays. The display can be located on the top of the device and can be configured to keep electronics housed therein protected from steam, water and heat and to enable easy viewing from a plurality of different angles.

In at least one embodiment, a fluidic temperature control device can include a detachable skirt which enables cleaning of the skirt and cleaning of a heater and water pump covered by the skirt. In at least one embodiment, the removable skirt can also expose the water pump impellers enabling a user to clean out food and debris. In at least one embodiment the skirt can be manually removed without tools. In at least one embodiment the skirt can be stainless steel, aluminum and/or plastic.

In at least one embodiment, a fluidic temperature control device can have a water proof or resistant submersible pump in which the motor can be located under water, at the water line, or above water, with inflow and outflow lines. In at least one embodiment, the submersible pump can be opened and/or accessed without tools for cleaning. In at least one embodiment, the device can be configured such that one or more motors of the device can be easily removed for cleaning or replacement. In at least one embodiment, the entire device can be sealed and can be submersed into water, whether purposely or by accident, without damaging any components of the device.

In at least one embodiment, a fluidic temperature control device can include a housing or body that defines the shape or form of the device. The housing can internally enclose and support various electrical components (e.g., motors, fans, and/or electronics). In at least one embodiment, the housing can be cylindrical. In another embodiment, the housing can be a shape other than cylindrical (e.g., rectangular, circular, square, and/or oval). In at least one embodiment, the housing can be an elongated body.

In at least one embodiment, a fluidic temperature control device for sous-vide cooking can include an upper portion including a controller, a display device and an input device coupled to the controller; a middle portion connected to the upper portion, the middle portion housing a motor coupled to the controller; a lower portion connected to the middle portion, the lower portion housing a fluid agitation device coupled to the motor, a heating element coupled to the controller, and the lower portion configured for at least partial immersion in a fluid.

In at least one embodiment, a fluidic temperature control device can include a clamp that enables an operator to secure the fluidic temperature control device to a container. In at least one embodiment, the clamp or other securement device can be configured to enable vertical height of the device to be adjusted with respect to the water bath or the chamber containing the bath, (for example, a cooking pot). In at least one embodiment, the fluidic temperature control device can have a ring clamp that enables an operator to angle or rotate the entire system to vector or angle the pump output or to turn the system for better display viewing angle.

In at least one embodiment, components of a fluidic temperature control device can be controlled by a remotely located device, for example, a phone, a server, a tablet, a Personal Computer (PC) or other electronic device. The remotely located device can be wirelessly and communicatively coupled to the fluidic temperature control device, for example, by Wi-Fi, Bluetooth, Near Field Communication (NFC), short-range wireless or other similar system capable of sending and receiving data. In at least one embodiment, the remotely located device can be configured to wirelessly transmit information to the fluidic temperature control device (e.g., cooking operations information, a warning that additional water is required in the chamber cooking the food, or an alert indicating that cooking has been completed). In at least one embodiment, the fluidic temperature control device can receive recipe specifications from the remote device. The recipe specifications can then direct the cook time, water pump speed, and cook temperature of the device.

In at least one embodiment, a fluidic temperature control device can include a memory storage unit. The memory storage unit can be used to store information (e.g., favorite recipes and cooking parameters for certain foods). In at least one embodiment, a fluidic temperature control device can store a plurality of recipe specifications and user generated data files. Users of the device can recall recipe specifications from an internal recipe book. In at least one embodiment, the fluidic temperature control device can categorize stored recipe specifications and generated data files which can be searchable.

In at least one embodiment, a fluidic temperature control device can be configured to communicate with a wireless thermometer. The wireless thermometer can be located in a bag or other suitable container containing food being cooked by the device. The wireless thermometer can be located proximate the food in the bag. A thermometer located proximate the food can enable the device to have highly accurate information about the temperature of the food being cooked. Accurate information regarding food temperature can enhance the quality of the cooked food and can aid in ensuring the food is properly and thoroughly cooked without being overcooked (thereby ensuring food safety). In at least one embodiment, the wireless thermometer can be inductively rechargeable.

In at least one embodiment, a fluidic temperature control device can be constructed to protect electronic components of the device from environmental factors associated with cooking (e.g., high temperatures, water, and steam). In at least one embodiment, one or more portions of the fluidic temperature control device can dynamically change color depending on operational state of the device. In at least one embodiment, the portions of the sealed housing can be configured to change color and to provide information regarding an operational state of the device.

In at least one embodiment, the upper portion of the fluidic temperature control device can be configured to protect the controller, display device and input device from steam during use. In at least one embodiment, the agitation device can be an impeller or a rotatable blade.

In at least one embodiment, the lower portion of the fluidic temperature control device can be composed of at least stainless steel, aluminum, or plastic. The lower portion can be configured to be removable without tools. In at least one embodiment, the lower portion can contain slits or openings running along at least a portion of a length of the lower portion. In at least one embodiment, the lower portion can be removable from the middle portion and removal of the middle portion exposes the agitation device. In at least one embodiment, the upper portion of the fluidic temperature control device can be rotatable with respect to the middle portion.

In at least one embodiment, the heating element can be proximate the agitation device. Additionally, the heating element can be housed substantially within the agitation device. In at least one embodiment, the controller can be configurable to control the temperature of the heating element. In at least one embodiment, the controller can be configurable to receive data inputted by the input device, the data comprising control commands to control the temperature of the heating element. At least one embodiment of a fluidic temperature control device for sous-vide cooking can include an upper portion including a turn-able display and an input device coupled to the microprocessor controller; a middle portion connected to the upper portion, the middle portion housing a temperature controller controlled by the microprocessor; and a lower portion connected to the middle portion. The lower portion can house or encase a submersible fluid agitation device including impellers and motor, and a heating element coupled to the temperature controller, the lower portion configured for at least partial immersion in a fluid.

In at least one embodiment, the upper portion and middle portion can be sealed, thereby preventing water entry, thereby protecting electronics, the display and other electrical devices within the fluidic temperature control device. In at least one embodiment, the agitation device can be wholly or partially submersible. The agitation device can include a pump system having a motor and an impeller. The agitation device can also comprise a rotatable impeller blade.

In at least one embodiment, the lower portion can be configured to be removable from the middle portion such that removal of the lower portion exposes the agitation device and heaters. In at least one embodiment, the middle portion can have two adjustable electrodes that can sense the water level. In at least one embodiment, the lengths of the electrodes can be adjustable to enable detection of different water levels. In at least one embodiment, the electrodes can be configurable with attachments that enable adjustment of a length of the electrodes.

In at least one embodiment, the microprocessor controller can be configurable to receive data inputted by the input device, the data comprising control commands to control the temperature of the heating element. In at least one embodiment, the controller is configurable to control the temperature of the heating element. In at least one embodiment, the heating element is located proximate the agitation device.

At least one embodiment of a fluidic temperature control device can comprise a controller located in a sealed housing; a submersible pump connected to the sealed controller; one or more adjustable electrodes to detect water level; and a ring clamp enabling the device to be turned, angled, and adjusted.

In at least one embodiment, the entire device can be submersed in water without negatively impacting the operation of the system. In at least one embodiment, the submersible pump can be opened without tools to expose the impeller blades. In at least one embodiment, the submersible pump can include a barb located on the pump outlet containing a tube receiver.

In at least one embodiment, a sous-vide cooking device can be releasably mountable upon a rim of a cook pot. The sous-vide cooking device can comprising an elongate body having an upper portion and a lower portion in an installed configuration, wherein the lower portion is configured to be at least partially submerged in a sous-vide water bath contained within a cook pot; a mounting device coupled to the elongate body by an interconnection that accommodates relative motion between the mounting device and the elongate body, the mounting device having a cook pot rim engaging portion for releasably fixing the mounting device to a rim of a cook pot; and the interconnection between the mounting device and the elongate body facilitating at least one of: (1) reciprocating motion of the elongate body relative to the mounting device and (2) rotational motion of the elongate body relative to the mounting device.

In at least one embodiment, the interconnection between the mounting device and the elongate body is a slip-connection that in a released configuration permits relative motion between the mounting device and the elongate body and in a secured configuration prevents relative motion between the mounting device and the elongate body.

In at least one embodiment, the slip-connection is friction-secured in the secured configuration thereby preventing relative motion between the mounting device and the elongate body.

In at least one embodiment, the relative motion that the interconnection accommodates between the mounting device and the elongate body is reciprocating motion of the elongate body relative to the mounting device.

In at least one embodiment, the relative motion that the interconnection accommodates between the mounting device and the elongate body is rotational motion of the elongate body relative to the mounting device.

In at least one embodiment, the upper portion further comprises a user display and the lower portion further comprises a water circulation outlet.

In at least one embodiment, the upper portion and a lower portion of the elongate body are rotatably coupled one relative to the other thereby accommodating various positions of the user display relative to the water circulation outlet.

In at least one embodiment, the upper portion of the elongate body has an outer housing that is substantially cylindrically shaped.

In at least one embodiment, the lower portion of the elongate body has an outer housing that is substantially cylindrically shaped.

In at least one embodiment, the upper portion of the elongate body has an outer housing that is similarly cylindrically shaped relative to the substantially cylindrically shaped outer housing of the lower portion so that the elongate body of the sous-vide cooking device is substantially uniformly cylindrically shaped along a majority of a length thereof.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Figure 1:
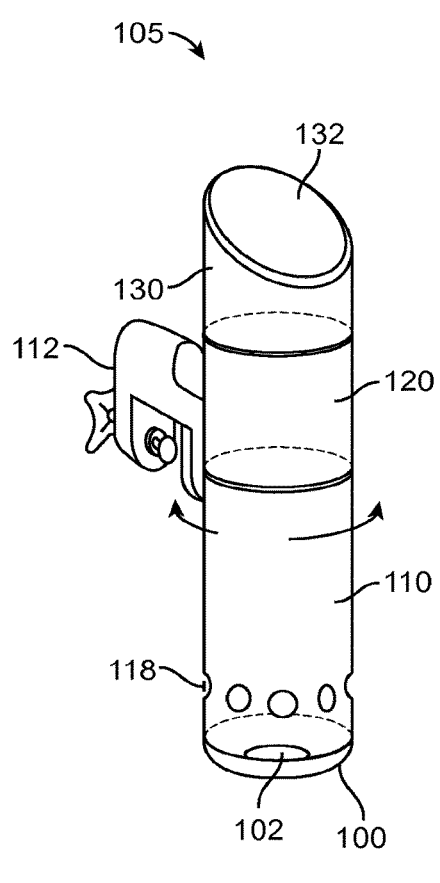
FIG. 1 illustrates a fluidic temperature control device in accordance with an example embodiment.
Figure 2:
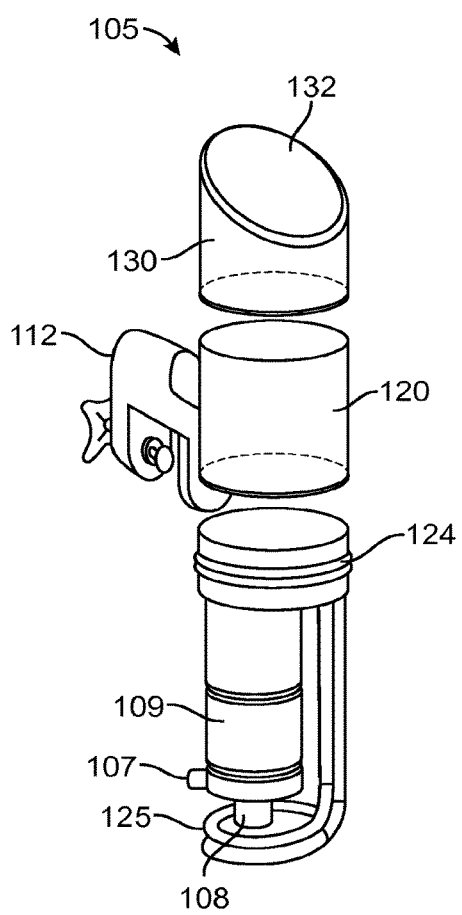
FIG. 2 illustrates a fluidic temperature control device in accordance with an example embodiment.

FIGS. 1 and 2 illustrate an example embodiment of a fluidic temperature control device 105. The temperature control device 105 can comprise an upper portion 130, a middle portion 120 and a lower portion 110. In at least one embodiment, a fluidic temperature control device can include two portions; an upper portion and a lower portion. In at least one embodiment, a fluidic temperature control device can include one portion. In at least one embodiment, a fluidic temperature control device can include one or more portions.

The upper portion 130 can include a display device 132 which can display information (e.g., the temperature of the fluid in which the lower portion 110 is at least partially immersed, the throughput at which intake and ejection ports are operating, or the speed at which an impeller housed within the lower portion is rotating). The upper portion 130 can also include an input device (e.g., one or more buttons, scroll wheels, or controls that can enable a user to select a temperature for the water in which the lower portion is at least partially immersed). In at least one embodiment, the input device can include physical buttons and/or virtual buttons rendered on display device 132. The buttons or input controls can include capacitive sensor pads.

The middle portion 120 can comprise a mounting device or ring clamp 112 enabling attachment of the fluidic temperature control device 105 to a container, or the like. Middle portion 120 can include housing 124 for motor and heater base. In some embodiments, the middle portion 120 is integrated into the upper portion 130 or lower potion 110.

Lower portion 110 can be configured with a cap 100 configured with one or more openings 102. Lower portion 110 can enclose submersible pump 109 with one or more liquid intake ports 107 and ejection ports 108. Alternatively, ports 108 can be fluid ejection ports and ports 107 can be fluid intake ports. The lower portion 110 can be configured with liquid intake (flow-in) openings 118 through which the heated water can be drawn by submersible pump 109, an impeller or other agitation device located within the lower portion 110 and ejected out of lower portion 110 through liquid ejection (flow-out) openings 102. Alternatively, openings 118 can be liquid output (flow-out) openings and openings 102 can be liquid intake (flow-in) openings. The lower portion 110 can enclosure a thermometer device for taking the temperature of the fluid in which it is immersed.

Figure 3:
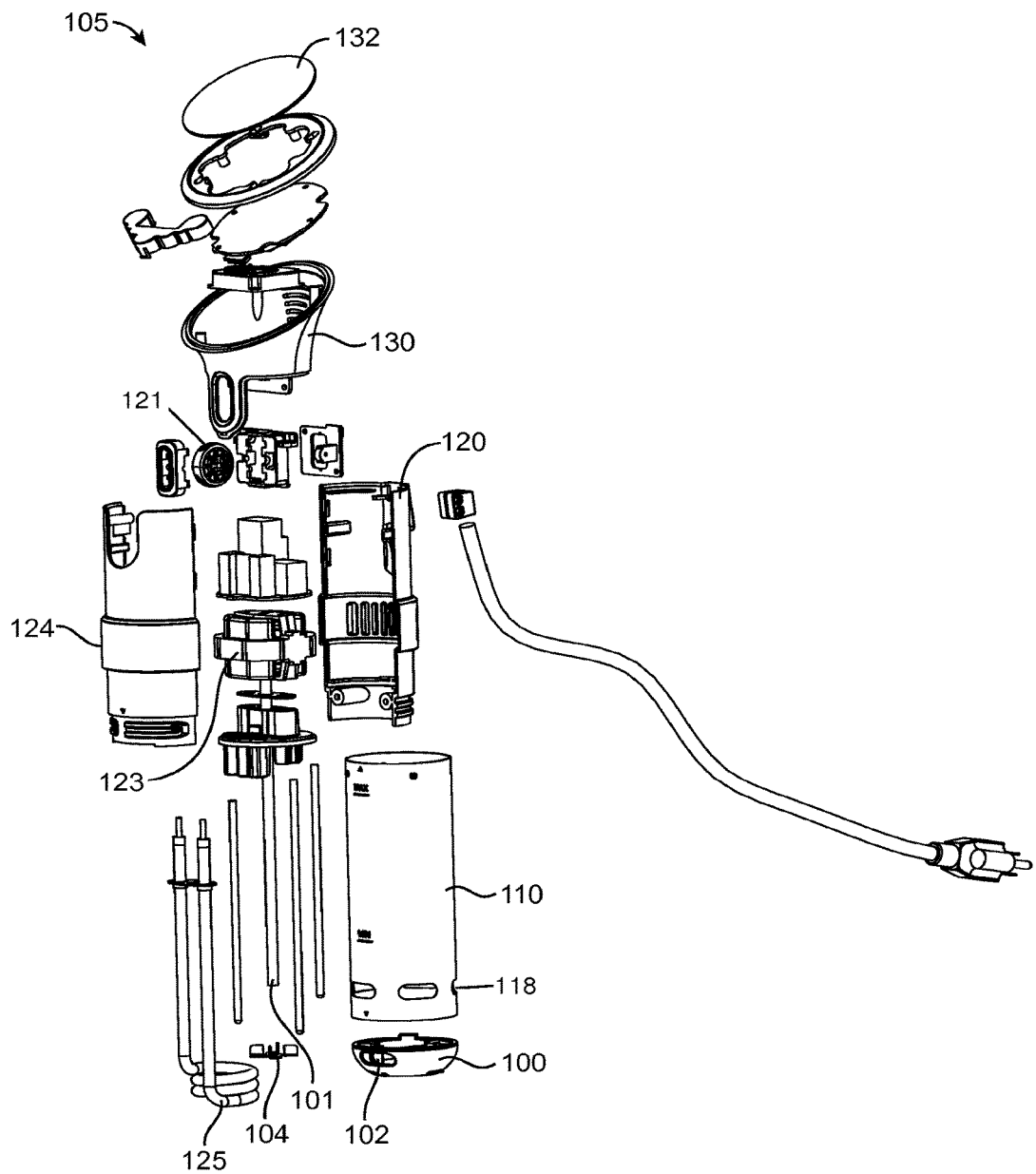
FIG. 3 illustrates a fluidic temperature control device in accordance with an example embodiment.

FIG. 3 illustrates components of at least one embodiment of a fluidic temperature control device 105. The device can include a lower portion 110. The lower portion 110 can be a removable, tool-less screw or clamp-on circulator pump housing or other agitation device housing. Lower portion 110 can include heaters 125, drive shaft 101 and impeller 104. The lower portion 110 can be composed of stainless steel or other suitable materials. In one embodiment, the lower portion 110 can be a removable clamp-on skirt. The lower portion 110 can be configured with one or more liquid intake (flow-in) openings 118. Alternatively, openings 118 can be liquid output (flow-out) openings. The device 105 can also include a liquid ejection (flow-out) cap 100 with one or more openings 102, on the side or bottom, through which fluid can pass (as liquid intake (flow-in) or liquid output (flow-out)). Middle portion 120 can enclose motor and heater base 123 connected to electric heaters 125. Middle portion 120 can also comprise a fan (not shown) to blow out any steam that may be present. Middle portion 120 can include collar 124 including one or more openings to provide ventilation to motor and heater base 123. The device 105 can also include an upper portion 130. The upper portion 130 can include a LCD display 132 with touch controls. In other embodiments, upper portion 130 can include a separate input device 121 (e.g., a scroll wheel, one or more buttons, etc.). Input device 121 and/or the touch controls of LCD display 132 can be configured to operate device 105 (e.g., set temperature, set time, select settings, etc.). Device 105 can be sealed against water/air and can be fully submersed for periods of time in the cooking container with the fluid being heated by the device.

Figure 4A:
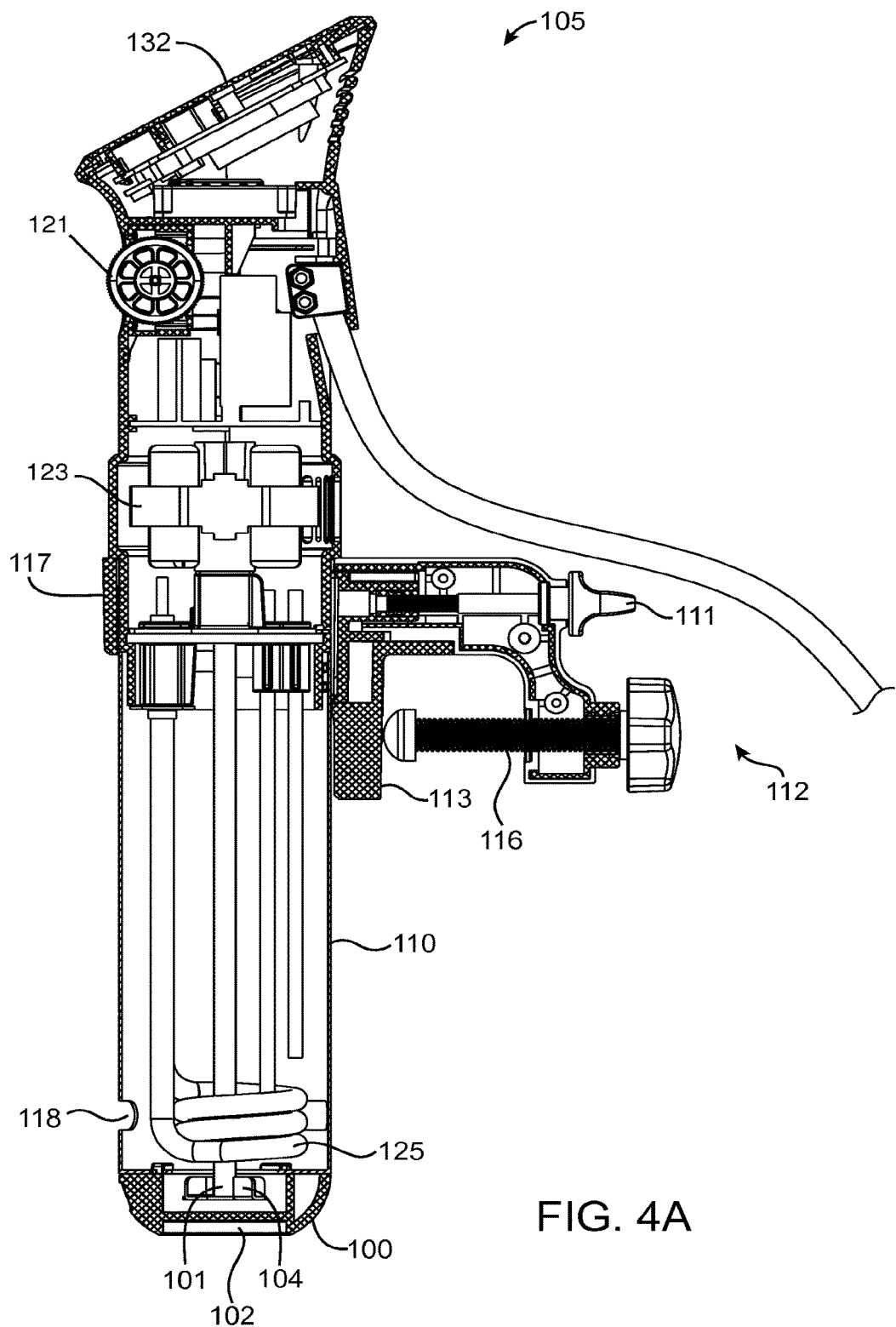
FIGS. 4A-4C are cross-sectional views illustrating a fluidic temperature control device in accordance with an example embodiment.

FIG. 4A is a cross-sectional view illustrating an example embodiment of fluidic temperature control device 105 having a mounting device or clamp 112. The clamp 112 can be configured to releasably secure the fluidic temperature control device 105 to a pot, or any container holding a fluid. The clamp 112 can have a collar 117 and an attachment portion 111 at the uppermost portion of the clamp. The collar 117 can circumferentially engage with device 105 by attachment portion 111. The attachment portion 111 can be spring operated and configured to enable the clamp 112 to attach to the fluidic temperature control device 105. In at least one embodiment, the interconnection between the clamp 112 and device 105 can facilitate at least a reciprocating motion and rotational motion of device 105 relative to clamp 112. The interconnection can be a slip-connection including a released configuration and a secured configuration. The released configuration enabling relative motion of device 105. The secured configuration preventing relative motion of device 105. The secured configuration can be friction based.

The engagement portion can further be configured to enable the device 105 to pivot or be angled away from the container. The clamp 112 can further have a stationary engagement portion 113 configured to engage an inner portion of a pot. The clamp 112 can further have a moveable engagement portion 116 configured to engage an outer portion of the pot thereby securing the fluidic temperature control device 105 to the pot. Engagement portion 116 can be screw, spring or latch operated. The collar 117 can be positioned at any point along the fluidic temperature control device 105 to enable vertical adjustment of device 105 immersed in the fluid of container 114.

Figure 4B:
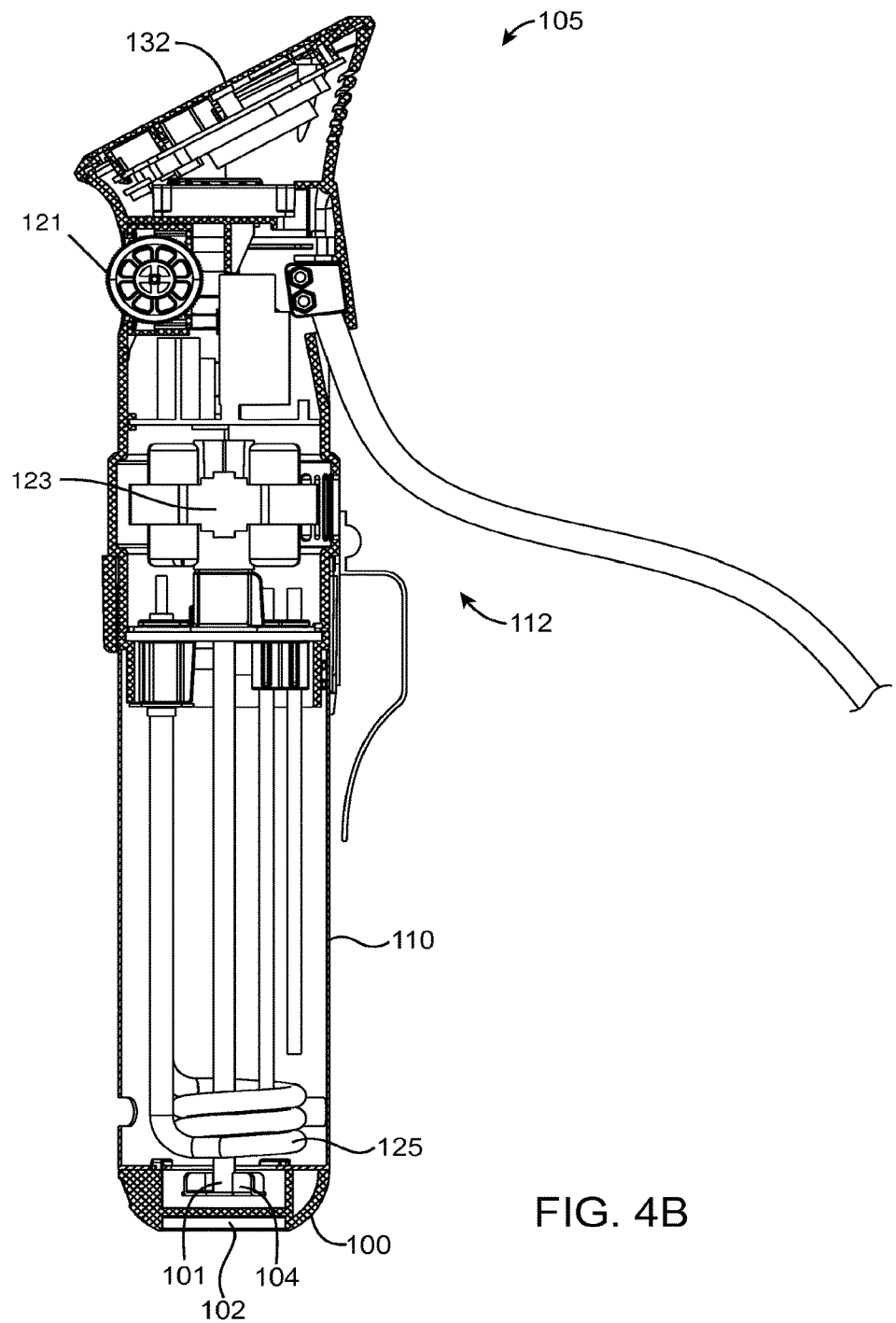

FIG. 4B is a cross-sectional view illustrating an example embodiment of fluidic temperature control device 105 having a clamp 112. The clamp 112 can be configured to releasably secure the fluidic temperature control device 105 to a pot, or any container holding a fluid. The clamp 112 can have an engagement portion at the uppermost portion of the clamp. The engagement portion can be spring operated and configured to allow the clamp 112 to pivot or be angled away from the fluidic temperature control device 105. The clamp 112 can further be configured to accommodate a lip of the pot. The clamp 112 can further be configured to engage an outer edge of the pot thereby securing the fluidic temperature control device 105 to the pot. Clamp 112 can be positioned at any point along the fluidic temperature control device 105 to enable adjustment in the length of the lower portion 110 that is immersed in fluid of container 114.

Figure 4C:
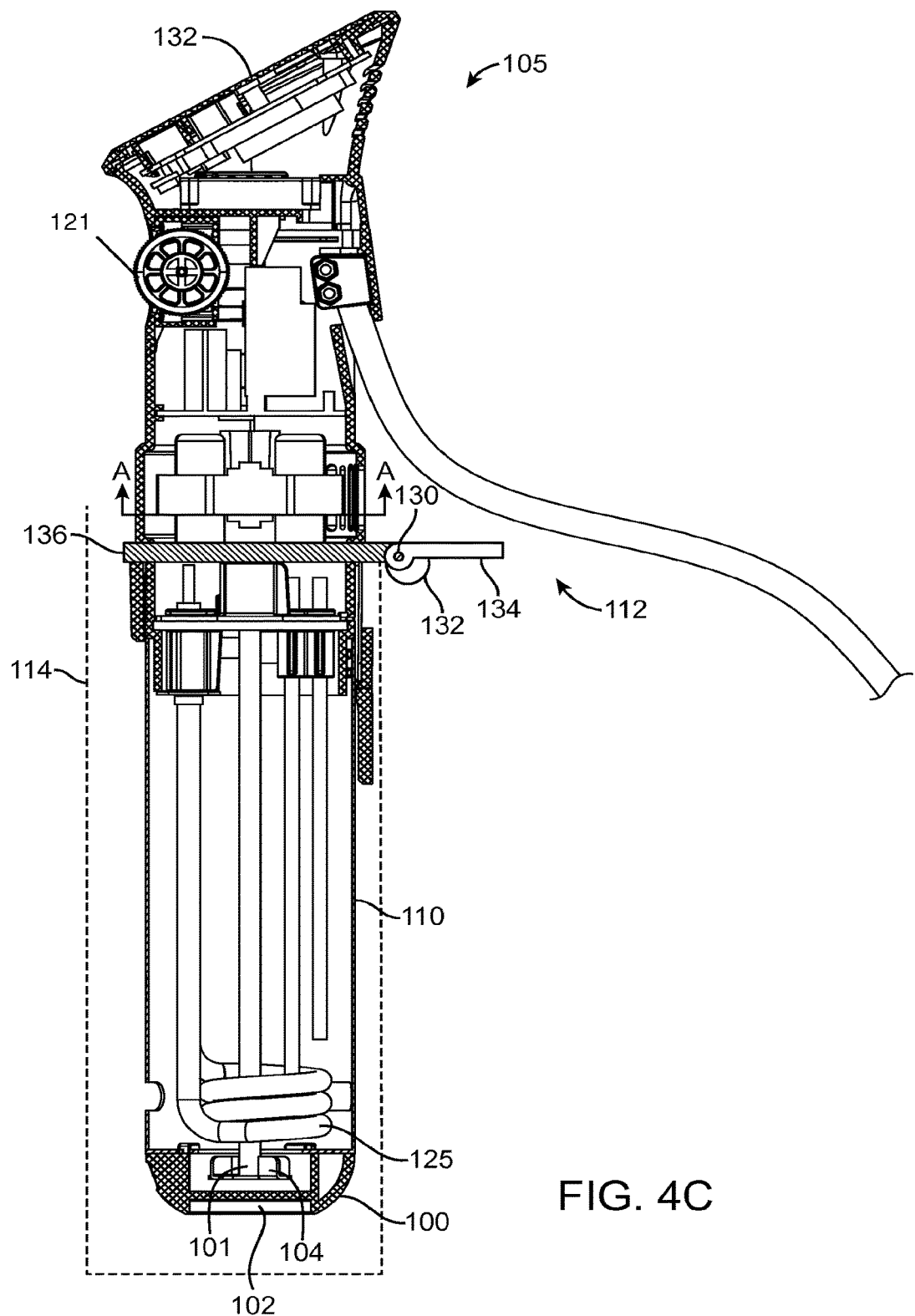

FIG. 4C is a cross-sectional view illustrating an example embodiment of a fluidic temperature control device 105. The clamp 112 can include a bracket 136 coupled to a pivotable lever 134. The lever 134 can be pivotably coupled to an axle 130 and configured to transition between an unlocked configuration 180, shown in FIG. 4D and a locked configuration 190, shown in FIG. 4E. The pivotable lever 134 can further include an abutment portion 132 (e.g., in the form of a cam lobe) configured to secure the clamp 112 and fluidic temperature control device 105 to a container 114 in locked configuration 190. The pivotable lever 134 can further be configured to enable the device 105 to pivot or be angled away from the container 114. The bracket 136 can be positioned at any point along the fluidic temperature control device 105 to enable adjustment in the length of the lower portion 110 that is immersed in fluid of container 114.

Figure 4D:
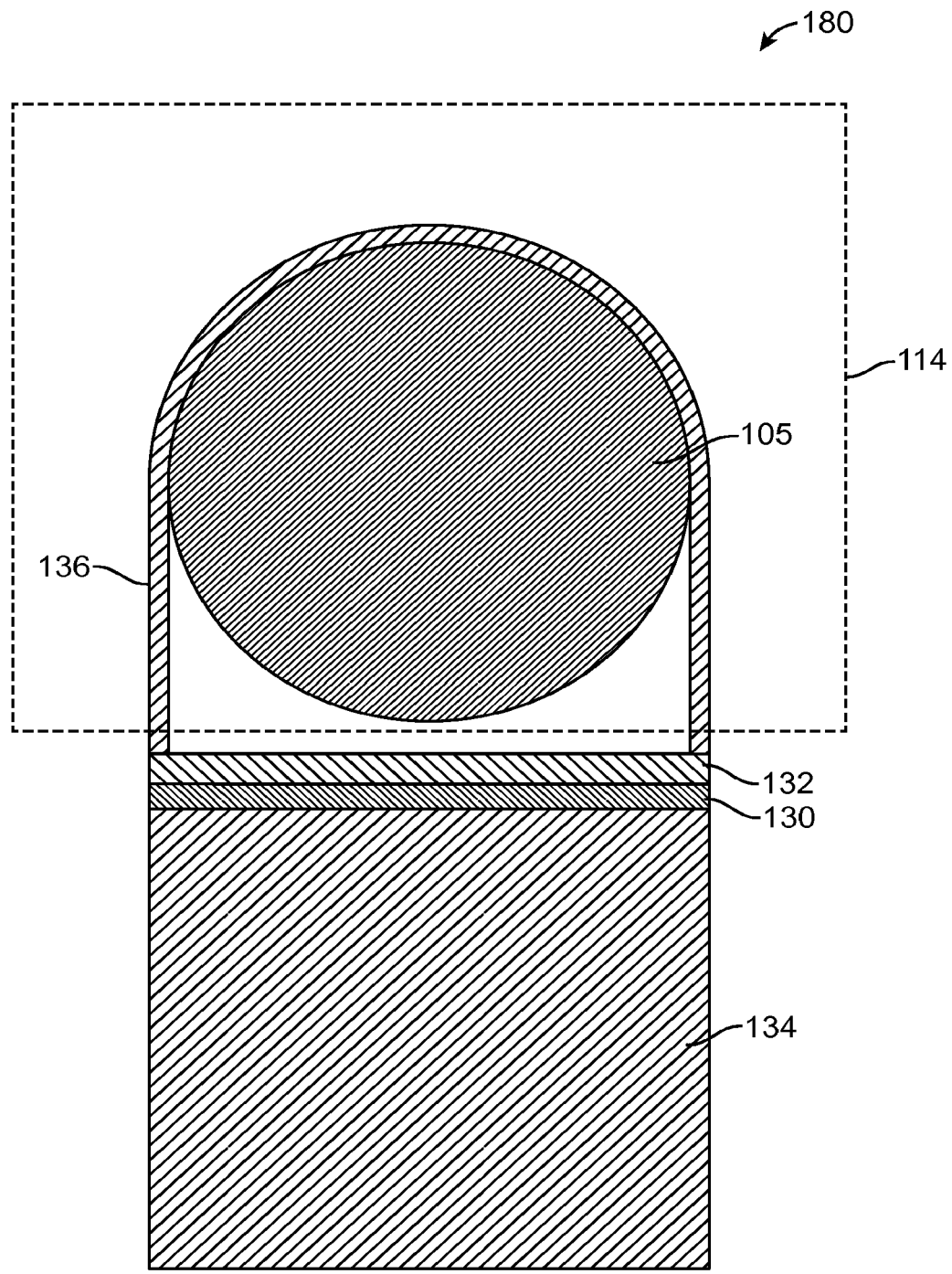
FIG. 4D-4E are cross-sectional top views illustrating a fluidic temperature control device in accordance with an example embodiment.

FIG. 4D is a cross-sectional top view illustrating an example embodiment of a fluidic temperature control device 105 engaged with a container 114 with the clamp 112 in an unlocked configuration 180. In the unlocked configuration 180, the lever 134 can be substantially perpendicular with device 105 and abutment portion 132 can not be engaged with the container 114. The bracket 136 can be positioned at any point along the fluidic temperature control device 105 to enable adjustment in the length of the lower portion 110 that is immersed in fluid of container 114.

Figure 4E:
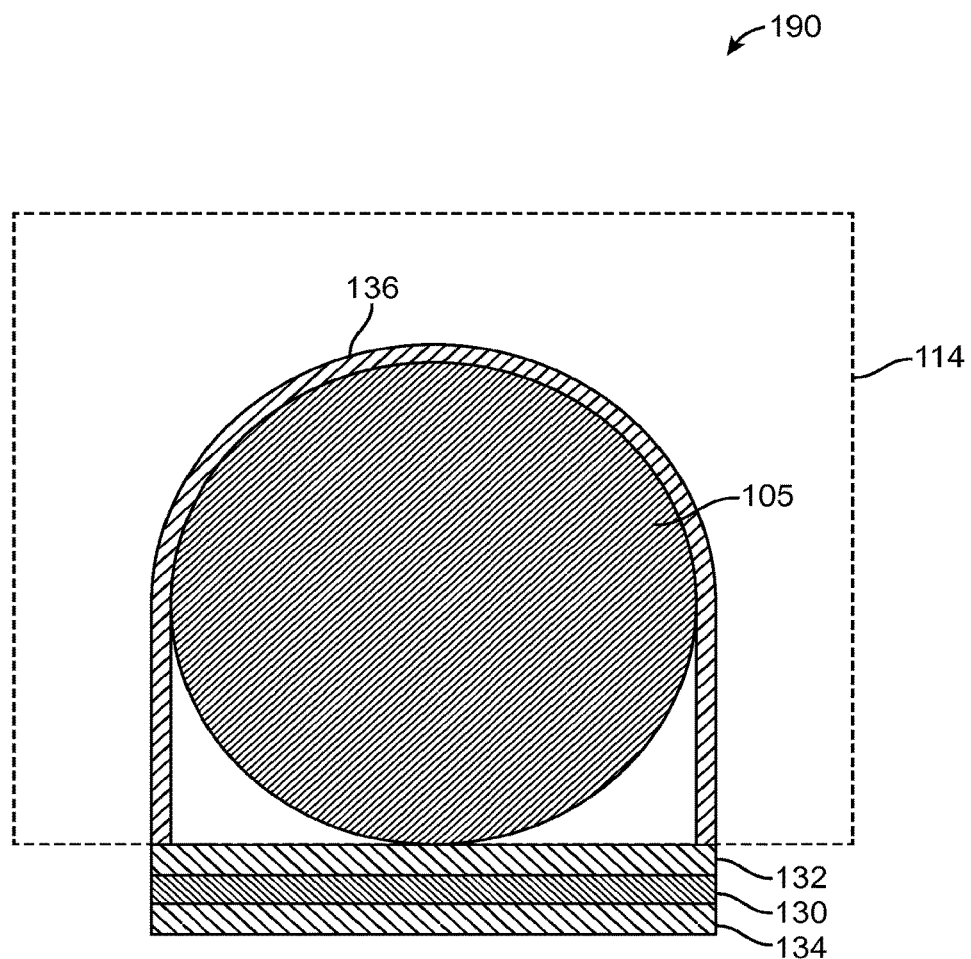

FIG. 4E is a cross-sectional top view illustrating an example embodiment of a fluidic temperature control device 105 engaged with a container 114 with the clamp 112 in a locked configuration 190. In the locked configuration 190, the lever 134 can be substantially parallel with device 105 and abutment portion 132 can be engaged with the container 114. The engagement of lever 134 affixes clamp 112 with container 114 and can remove slop between the bracket 136 and the fluidic temperature control device 105. The engagement can further prevent movement of the bracket 136 relative to the fluidic temperature control device 105 and can lock the position of the bracket 136 on the fluidic temperature control device 105 relative to the container 114.

Figure 5:
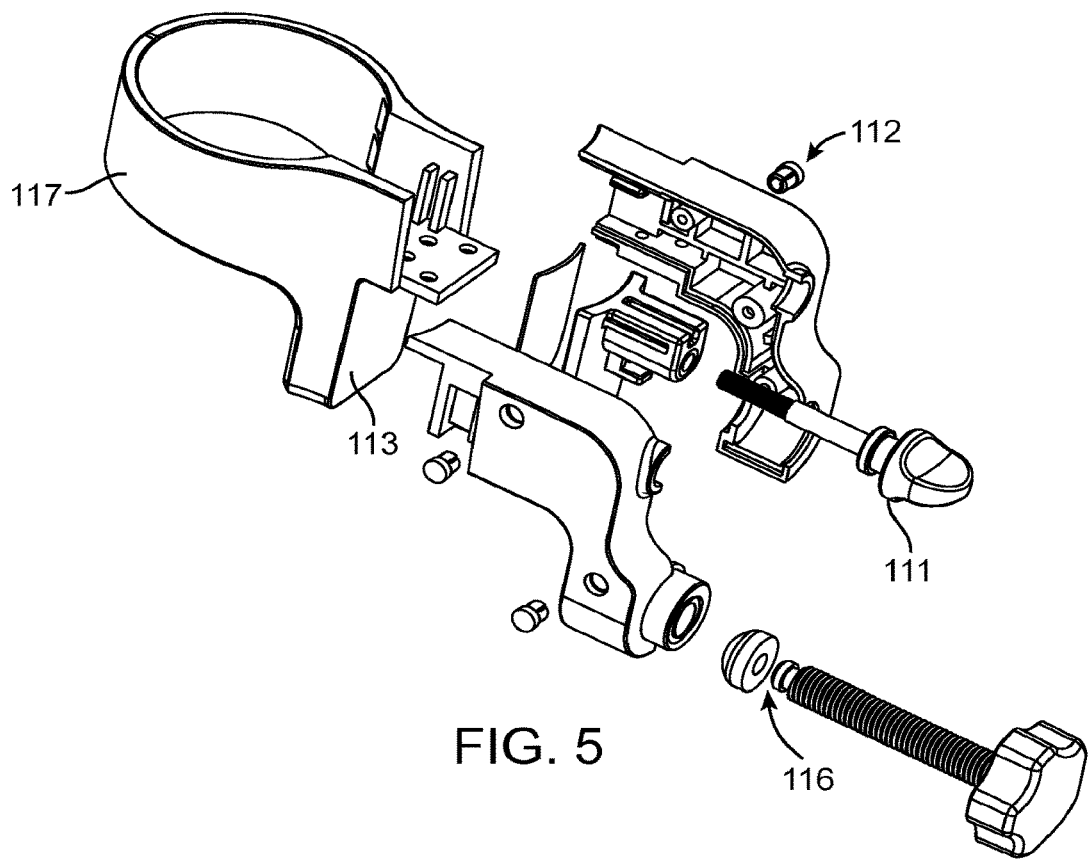
FIGS. 5-6 illustrates a clamping mechanism for a fluidic temperature control device in accordance with an example embodiment.
Figure 6:
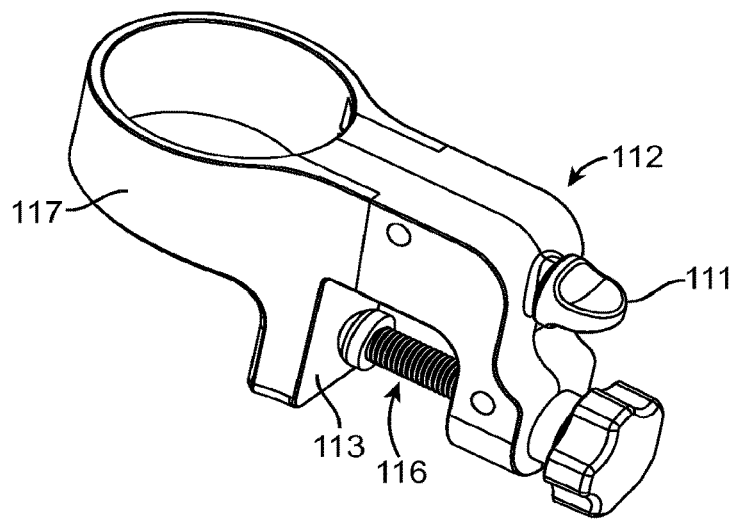

FIG. 5 and FIG. 6 illustrate an exploded view and assembled view of an example clamp 112 respectively. Clamp 112 can include a collar 117 to engage with a fluidic temperature control device (not shown). Collar 117 can be engaged by actuating attachment portion 111. Attachment portion 111 can be configured as a screw mechanism, latch mechanism, spring-loaded or any other configuration for attaching a collar to a device. When attachment portion 111 is actuated, collar 117 can be engaged with the temperature control device preventing movement of collar 117. Clamp 112 can also include a stationary engagement portion 113. Stationary engagement portion 113 can be configured to engage the inside wall of a container. Clamp 112 can also include a moveable engagement portion 116. Moveable engagement portion 116 can be configured to engage the outside wall of a container. Moveable engagement portion 116 can be actuated by a screw mechanism. In another embodiment, moveable engagement portion 116 can be screw mechanism, latch mechanism, spring-loaded or any other configuration for attaching the collar to a container. Clamp 112 can also be configured to rotate, angle or vector device 105 relative to a container.

Figure 7:
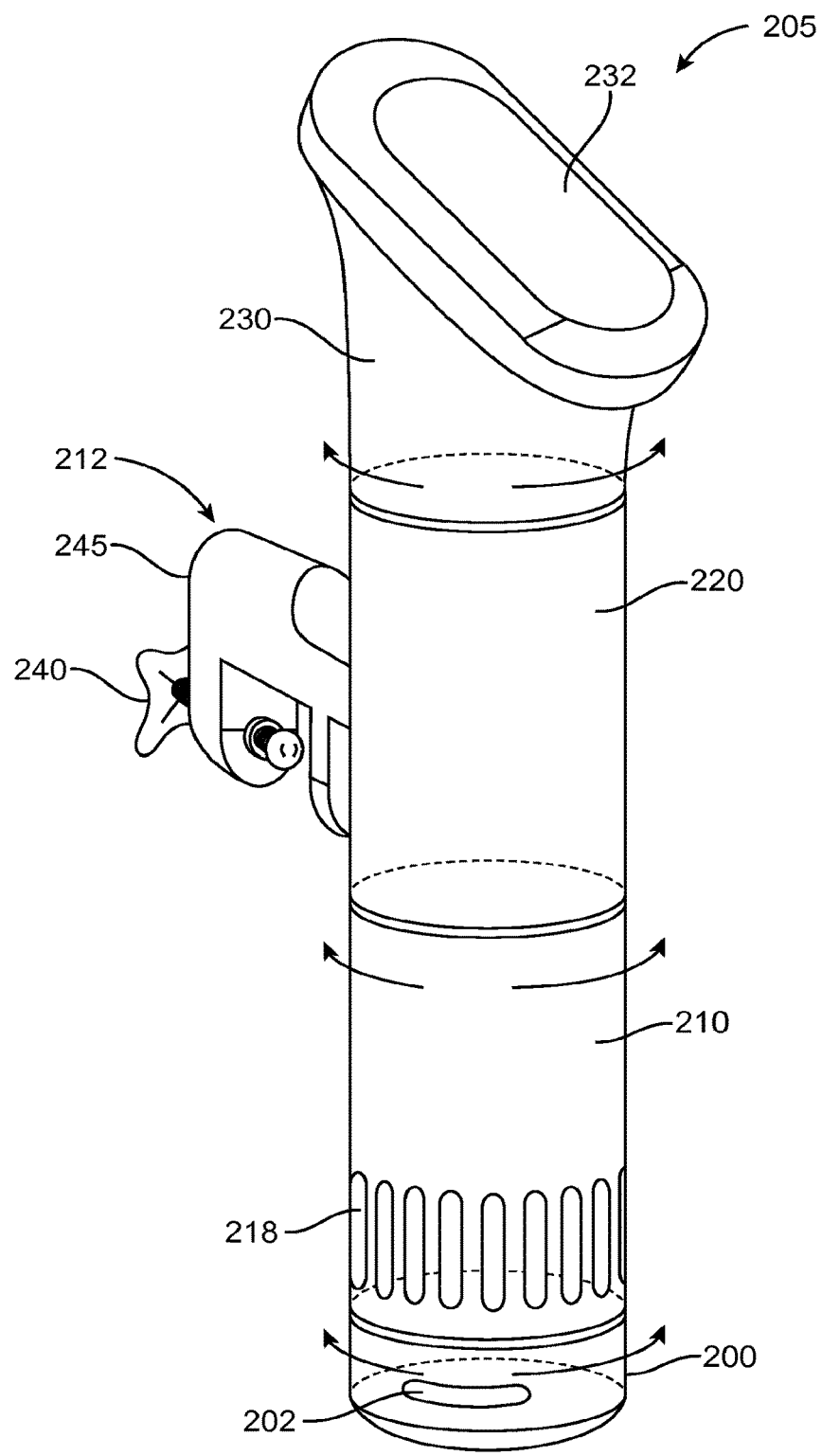
FIG. 7 illustrates a fluidic temperature control device in accordance with an example embodiment.

FIG. 7 illustrates an assembled view of an embodiment of an example fluidic temperature control device 205. The temperature control device 205 comprises an upper portion 230, a middle portion 220, and a lower portion 210. The upper portion 230 can include a display device 232 which can display information (e.g., the temperature of the fluid in which the lower portion 210 is at least partially immersed, the throughput at which intake and ejection ports are operating or the speed at which an impeller housed within the lower portion is rotating). The display device 232 can also include an input device. The input device can be integrated with display device 232 by a touch screen. In at least one embodiment, input device can include one or more buttons, scroll wheels, or controls, which can enable a user to select a temperature for the water in which the lower portion is immersed. The middle portion 220 can enclose a motor and heater base. The lower portion 210 can include cap 200 with one or more openings 202. The one or more openings 202 can be configured to draw in heated water or eject out heated water by a submersible pump, an impeller, or other agitation device located within the lower portion 210. The lower portion 210 can be configured with one or more openings 218 through which the heated water can be drawn in or ejected out by a pump, an impeller or other agitation device located within lower portion 210. Device 105 can also include clamp 212. Clamp 212 can include a clamping hanger 240 that can be configured to connect to the middle portion 220 by a clamp joint 245. A power jack (not shown) can be located in the clamp joint 245.

Figures 8, 9:
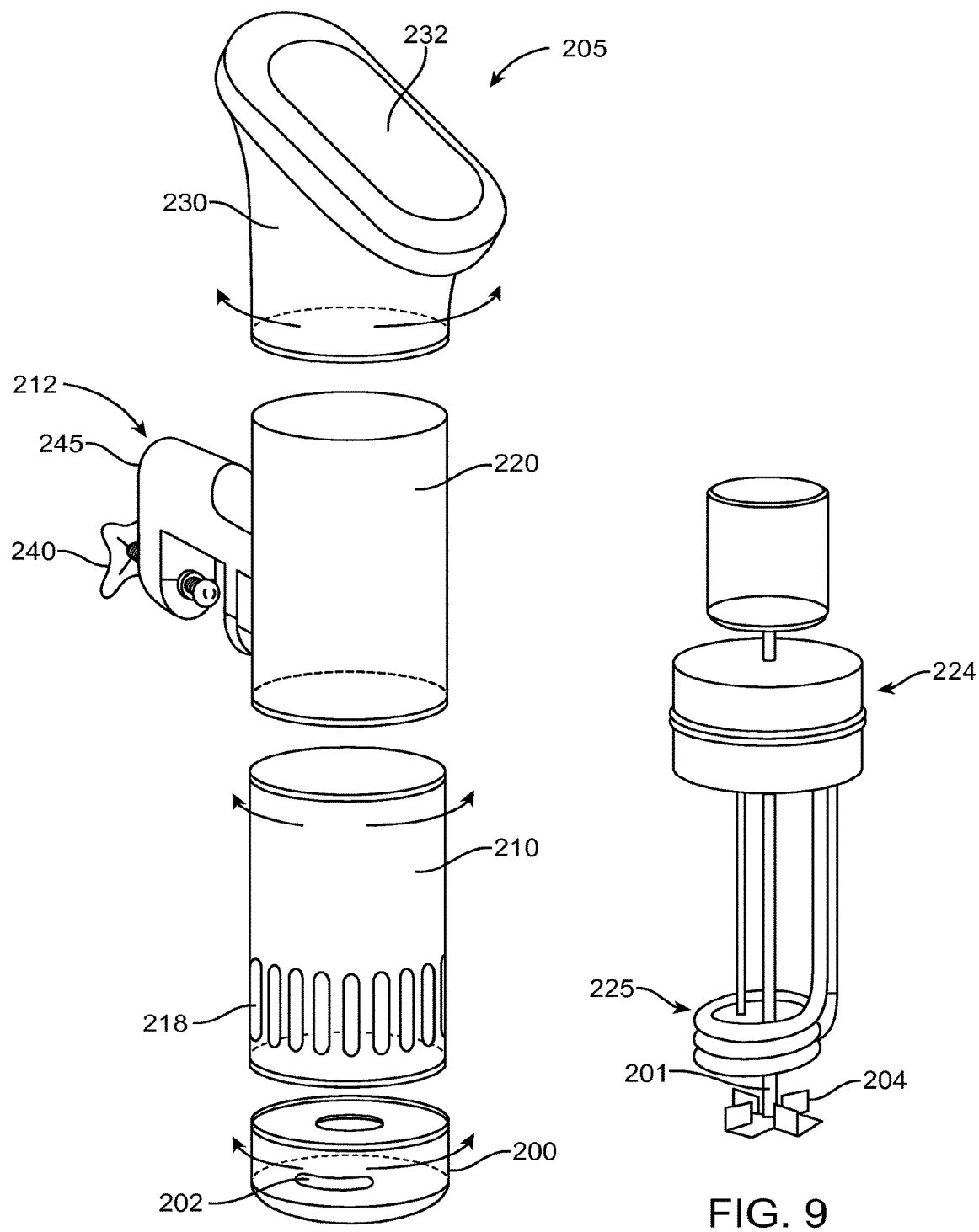
FIG. 8 illustrates a fluidic temperature control device in accordance with an example embodiment.
FIG. 9 illustrates a fluidic temperature control device in accordance with an example embodiment.

FIG. 8 and FIG. 9 illustrate an exploded view and an internal view of an embodiment of an example fluidic temperature control device 205, respectively. The device 205 can include a removable, tool-less screw-on or clamp-on lower portion 210 with a cap 200. In one embodiment the lower portion 210 can be a skirt. The lower portion 210 and cap 200 can be composed of stainless steel or other suitable material. The lower portion 210 can engage middle portion 220 by removable screw-on or clamp-on mechanisms. Cap 200 can include one or more openings 202 which can be configured to draw in heated water or eject out heated water by a submersible pump, an impeller, or other agitation device located within the lower portion 210. The cap 200 can engage lower portion 210 by removable screw-on or clamp-on mechanisms. The lower portion 210 and the cap 200 can rotate in order to let the opening 202 aim to various directions in the water tank. The lower portion 210 can be configured with one or more liquid intake (flow-in) one or more openings 218. In at least one embodiment, one or more openings 218 can be liquid output (flow-out) openings. In at least one embodiment, a circulator pump 224 including an impeller 204 which can be used to mix or circulate a fluid (for example, cooking water) is substantially within the lower portion 210. The impeller 204 can be connected to a pump motor drive shaft 201, which can be rotatably connected to the circular motor 224. The circulator motor 224 can rotate motor drive shaft 201 actuating impeller 204. When actuated, impeller 204 can draw in and eject out fluid through openings 218 and 202. In at least one embodiment, the middle portion 220 can include circulate motor 224, the motor being configured to drive a pump or impeller to agitate the fluid. The middle portion 220 can also comprise a fan (not shown) to blow out any steam that may be present through openings in middle portion 220 (not shown). Upper portion 230 can rotate 360 degrees and include a display 232. The display 232 can include an LCD display with touch controls. Upper portion 230 can engage middle portion 220 by removable screw-on or clamp-on mechanisms. Device 205 can also include clamp 212. Device 205 can be removably attached to a container, containing the fluid, being heated by the device 205. Claim 212 can include a clamping hanger 240 that can be configured to connect to the middle portion 220 by a clamp joint 245. A power jack (not shown) can be located in the clamp joint 245.

Figure 10:
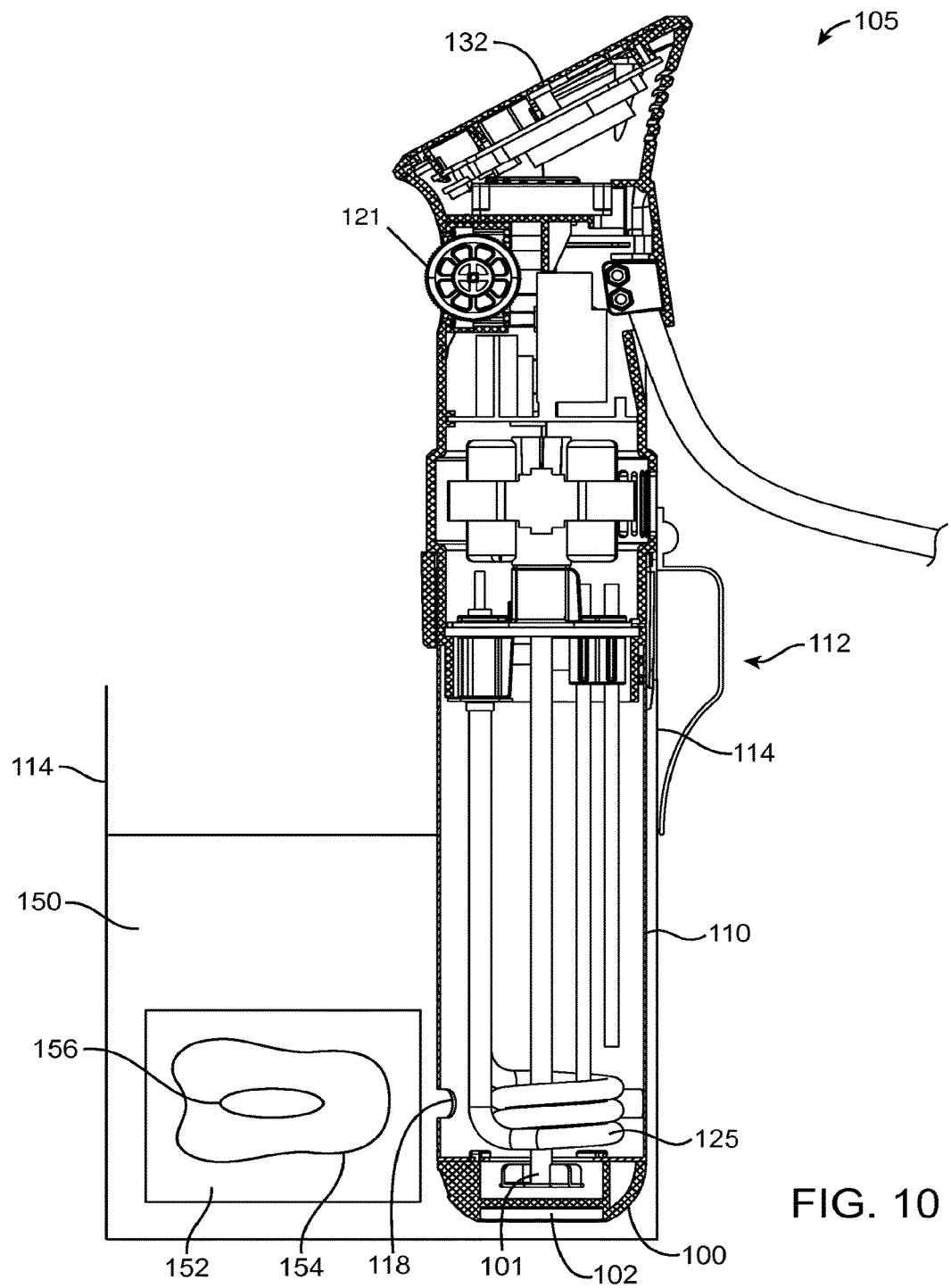
FIG. 10 is a cross-sectional view illustrating a fluidic temperature control device in accordance with an example embodiment.

FIG. 10 illustrates an example fluidic temperature control device 105 in communication with a wireless temperature sensor. Device 105 is adjustably attached to container 114 containing fluid 150 (e.g., water). The temperature of fluid 150 can be regulated by device 105, as previously described. The wireless temperature sensor 156 can be placed proximate (or within) the food 154 within a sealed container 152 (e.g., a plastic bag or plastic envelope) located in fluid 150. In another embodiment, the temperature sensor can be wired to and located at fluidic temperature control device 105. Wireless temperature sensor 156 can connect to and transmit temperature data to device 105. Wireless temperature sensor 156 can connect to and transmit temperature data to an electronic device in communication with device 105.

Figure 11:
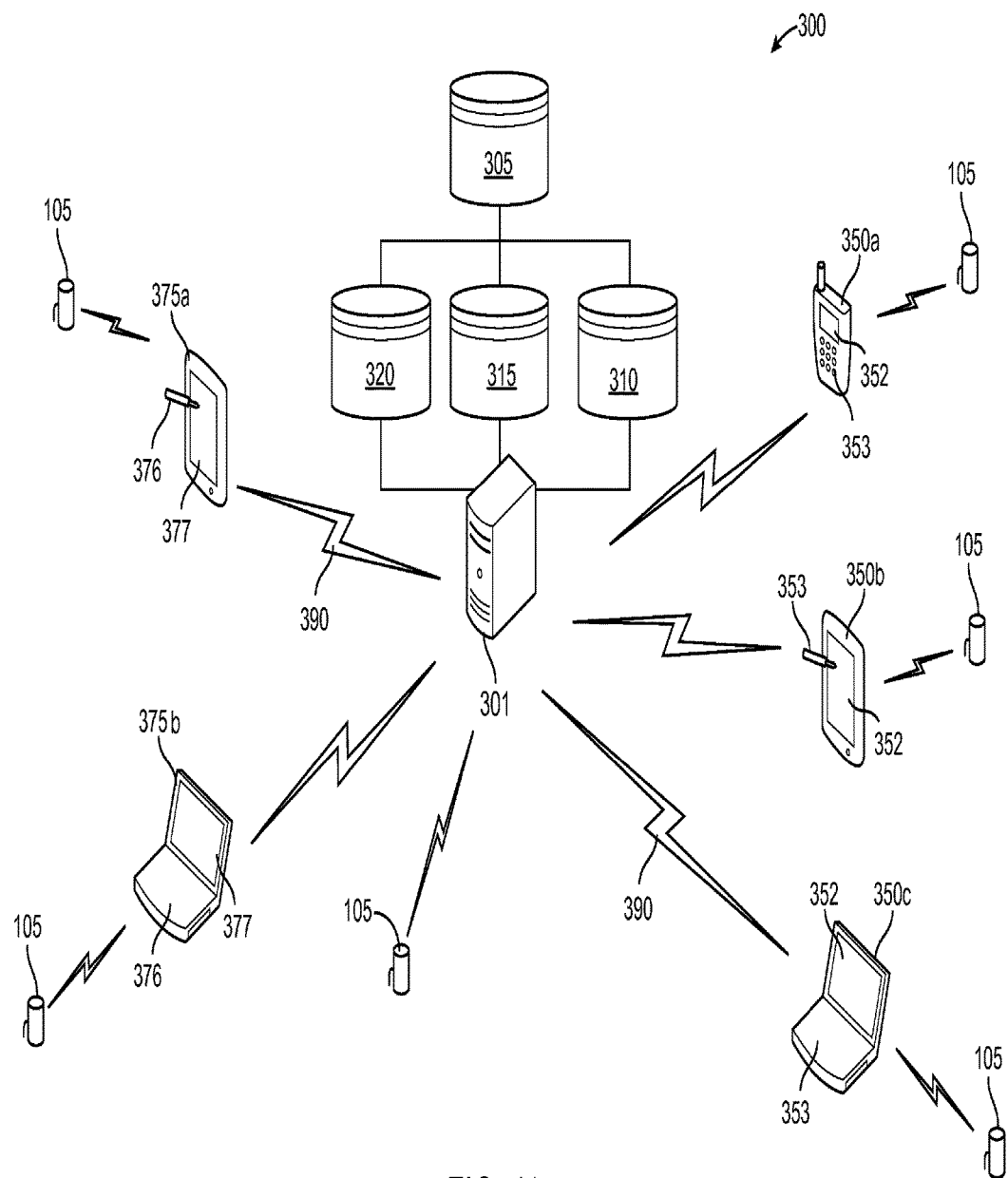
FIG. 11 is a block diagram of a system for enabling users of fluidic temperature control devices to share control and recipe information in accordance with an example embodiment.

FIG. 11 is a block diagram of a system 300 for enabling users of fluidic temperature control device 105 (e.g., a sous-vide cooker and related electronic devices) to share control and recipe information. System 300 can include one or more servers 301, one or more client electronic devices 350a-c, and one or more professional electronic devices 375a-b, one or more fluidic temperature control device 105 coupled to or more electronic device 350a-c, 375a-b and/or server 301. Device 105 can be wirelessly controlled by, and in signal communication with, one or more electronic devices 350a-c, 375a-b or one or more servers 301. The system 300 can be accessed by any one of the one or more client electronic devices 350a-c and one or more professional electronic devices 375a-b by a web browser, the Internet, the World Wide Web, an intranet, a web-based application, a smartphone application, an electronic pad application, or any other application executable on an electronic device by wireless or wired communication interface.

In at least one embodiment, the server 301 can be a system of servers. In other embodiments, the server 301 can be a single central server 301. In other embodiments, the server 301 can be a web-based server, a webserver, a cloud-based server, a backend server associated with a website or application of the system 300. Although not illustrated in FIG. 11, the server 301 can include at least one processor. In other embodiments, the server 301 can include more than one processors. The server 301 can be configured to receive, process, and transmit data and requests from the one or more client electronic devices 350a-c and the one or more professional electronic device 375a-b. The requests, which execute processes, can be associated with at least recipe, cooking, and control related instructions to the one or more client electronic devices 350a-c and interfaces between the one or more client electronic devices 350a-c and the one or more professional electronic devices 375a-b.

Server 301 can be communicatively coupled to a recipes database 305. The recipes database 305 can be a non-transitory or transitory computer-readable storage medium. The recipes database 305 can include data associated with one or more foods and/or recipes. For example, the recipes database 305 can include preparation, seasoning, measurement, cooking and temperature information related to the one or more foods and/or recipes.

The server 301 can also be communicatively coupled to a search terms database 310. The search terms database 310 can include a glossary of terms associated with the information of the recipes database 305. For example, the terms of the search terms database 310 can be associated with one or more aspects of recipes of the recipes database 305 (for example, by food type, recipe name, metadata, key value pairs, etc.).

The server 301 can be communicatively coupled with a user review database 315. The user review database 315 can include data representing user reviews of the one or more recipes stored in the recipes database 305. For example, the user review database 315 can include data representing one or more user reviews of a recipe stored in the recipes database 305. In at least one embodiment, the user review can include critiques, reviews, ratings, and comments regarding the recipes stored in the recipes database 305.

The server 301 can also be communicatively coupled with a user suggestion database 320. The user suggestion database 320 can include data representing user suggestions regarding recipes stored in the recipes database 305. In at least one example, the user suggestion can include critiques, reviews, and comments regarding the suitability of the recipes in the recipes database 305. For example, the user suggestion can be an electronic survey, an electronic peer performance rating, an electronic comment card, or any other electronic representation of a suggestion that can be stored in and queried from the user suggestion database 320. The user suggestion data stored in the user suggestion database 320 can be paired with the data stored in the recipes database 305, such that the data stored in the recipes database 305 can be paired or retrieved when corresponding user suggestion data is retrieved.

Databases 305, 310, 315, and 320 are shown in FIG. 11 as being independent databases communicatively coupled with each other and server 301. In at least one embodiment, databases 305, 310, 315, and 320 can be one database communicatively coupled to server 301. In another embodiment, databases 305, 310, 315, and 320 can be one or more databases communicatively coupled to each other and server 301.

Client electronic devices 350a-c can be configured to access a sous-vide cooking community (e.g., social network, virtual cooking community, professional cooking community, etc.) associated with or hosted by the server 301. Client electronic devices 350a-c can include a smartphone 350a, an electronic table 350b, and a portable computer 350c, or any other type of electronic device including portable communication devices, mobile communication devices, mobile computers, smartphones, computing pads, electronic pads personal computers, desktop computers, laptop computers, netbooks, servers, routers, set-top phones, or other electronic devices capable of at least accepting data, transmitting data, and executing commands. In another embodiment, the client electronic device can be device 105. Client electronic devices 350a-c can search for and select recipes to use with device 105. The client electronic device 350a-c can receive the recipes and then transmit the recipes and cooking instruction to device 105. In other embodiments, device 105 can determine the cooking instructions from the recipe. Client electronic devices 350a-c can search for, select and conduct virtual consultations with a professional chef of the sous-vide cooking community at any location convenient for the client, for example a virtual consultation with a professional remote from the professional chef. The electronic devices 350 can also be configured to operate with audio and visual hardware (for example speakers, microphones, video cameras, display screens 352, and other audio-visual hardware) by which the clients operating the client electronic device 350a-c can conduct virtual consultations. The client devices 350a-c can also include input interfaces 353 by which user of the client device 350a-c can enter or input data. The entered or inputted data can be transmitted to server 301 or device 105. For example, the input interfaces 353 can include but are not limited to keyboards, touchscreens, touch sensitive displays, voice command interface, gaze tracking interfaces, motion input interfaces, or any other input interface by which user inputs can be entered.

Client electronic devices 350a-c and fluidic temperature control device 105 can be communicatively coupled to the server 301 by a network 390. For example, the network 390 can include a communication network, a wireless network, an intranet, the Internet, a cellular network, a mobile network, a local area network, wide area network, a near field communication network, a cloud-based network, peer-to-peer networks, ad-hoc networks, or any other such network or combination thereof. Protocols and components for communicating via such a network are well known and will not be discussed herein in detail. Communication over the network 390 can be enabled by wired or wireless connections, and combinations thereof. In one embodiment, server 301 is a web-based server and network 390 is the Internet for receiving requests and serving content in response thereto, although for other networks an alternative device serving a similar purpose could be used as would be apparent to one of ordinary skill in the art. While FIG. 11 illustrates a plurality of electronic devices 350a-c and devices 105, it will be appreciated that a plurality of users, each having one or more electronic devices, can be communicatively coupled to the server 301 to access the sous-vide cooking community.

A professional chef can access the sous-vide cooking community associated with the server 301 (for example, hosted by the server 301) by professional electronic devices 375a-b. For example, the professional chef's professional electronic devices 375a-b can include an electronic tablet 375a and a portable computer 375b. However, the professional electronic devices 375a-b can be any other type of electronic device including portable communication devices, mobile communication devices, mobile computers, smartphones, computing pads, electronic pads, personal computers, desktop computers, laptop computers, netbooks, servers, routers, set-top phones, or other electronic devices capable of at least accepting data, transmitting data, and executing commands. In another embodiment, the professional electronic device can be device 105. A professional chef can respond to questions and requests for information from other members of the sous-vide cooking community. That is, the professional chef can conduct a virtual cooking consultation with a user remote from the professional chef. The electronic devices 375a-b can also be configured with audio and visual hardware (for example speakers, microphones, video cameras, display screens 377, and other audio-visual hardware) by which the user operating the professional electronic device 375a-b can conduct virtual cooking consultations. The professional electronic device 375a-b can also include input interfaces 376 by which user of the professional electronic device 375a-b can enter or input data. The entered or inputted data can be transmitted to server 301. For example, the input interfaces 376 can include but are not limited to keyboards, touchscreens, touch sensitive displays, voice command interface, gaze tracking interfaces, motion input interfaces, or any other input interface by which user inputs can be entered. The electronic devices 375a-b can be communicatively coupled to the server 301 by a network 390. For example, the network 390 can include a communication network, a wireless network, an intranet, the Internet, a cellular network, a mobile network, a local area network, wide area network, a near field communication network, a cloud-based network, peer-to-peer network, ad-hock network, or any other such network or combination thereof. Protocols and components for communicating via such a network are well known and will not be discussed herein in detail. Communication over the network can be enabled by wired or wireless connections, and combinations thereof. In one embodiment, server 301 is a web-based server and network 390 is the Internet for receiving requests and serving content in response thereto, although for other networks an alternative device serving a similar purpose could be used as would be apparent to one of ordinary skill in the art. While FIG. 11 illustrates a plurality of professional electronic devices 375a-b associated with one professional chef, it will be appreciated that a plurality of professionals, each having one or more electronic devices, can be communicatively coupled to the server 301 to access the sous-vide cooking community.

Figure 12:
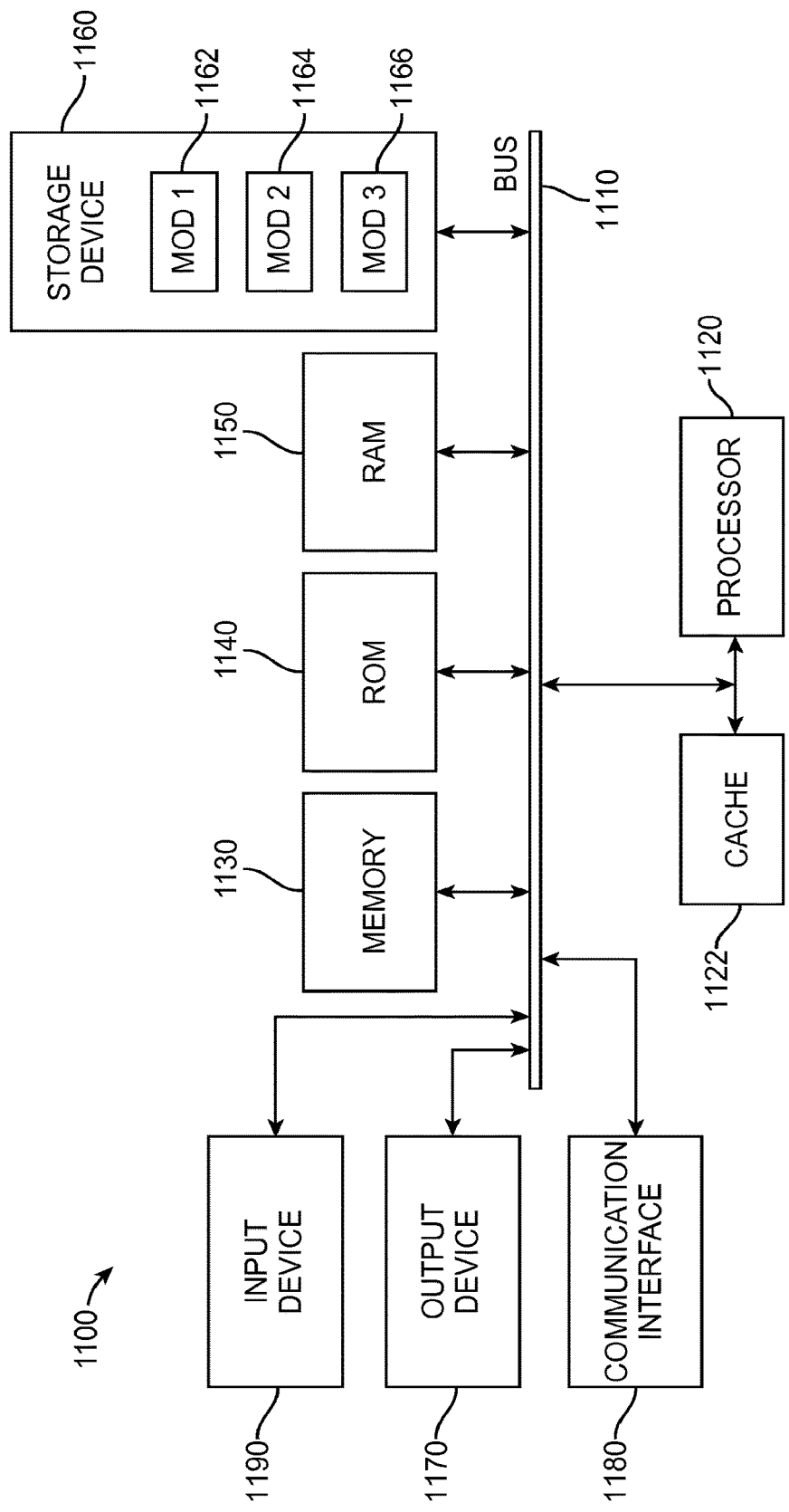
FIG. 12 is a system and/or control unit for a fluidic temperature control device or related electronic device in accordance with an example embodiment.

FIG. 12 illustrates an example system and/or control unit 1100 of device 105 including a processing unit (for example, a central processing unit (CPU) or processor) 1120 and a system bus 1110 that couples various system components, including the system memory 1130 such as read only memory (ROM) 1140 and random access memory (RAM) 1150, to the processor 1120. The system 1100 can include a cache 1122 of high-speed memory connected directly with, in close proximity to, or integrated as part of the processor 1120. The system 1100 can copy data from the memory 1130 and/or the storage device 1160 to the cache 1122 for access by the processor 1120. These and other modules can control or be configured to control the processor 1120 to perform various operations or actions. The memory 1130 can include multiple different types of memory with different performance characteristics.

Multiple processors or processor cores can share resources such as memory 1130 or the cache 1122, or can operate using independent resources. The processor 1120 can include one or more of a state machine, an application specific integrated circuit (ASIC), or a programmable gate array (PGA) including a field PGA. The system bus 1110 can be any of several types of bus structures including a memory bus or memory controller, a peripheral bus, and a local bus using any of a variety of bus architectures. A basic input/output (BIOS) stored in ROM 1140 or the like, can provide the basic routine that helps to transfer information between elements within the computing device 1100, such as during start-up.

The computing device 1100 can further include storage devices 1160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 1160 can include software modules 1162, 1164, 1166 for controlling the processor 1120. The system 1100 can include other hardware or software modules. Although the exemplary embodiment(s) described herein employs the hard disk as storage device 1160, other types of computer-readable storage devices which can store data that are accessible by a computer, such as magnetic cassettes, flash memory cards, digital versatile disks (DVDs), cartridges, random access memories (RAMs) 1150, read only memory (ROM) 1140, a cable containing a bit stream and the like can also be used in the exemplary operating environment. Tangible computer-readable storage media, computer-readable storage devices, or computer-readable memory devices, expressly exclude media such as transitory waves, energy, carrier signals, electromagnetic waves, and signals per se.

The basic components and appropriate variations can be modified depending on the type of device, such as whether the device 1100 is a small, handheld computing device, a desktop computer, or a computer server. When the processor 1120 executes instructions to perform "operations", the processor 1120 can perform the operations directly and/or facilitate, direct, or cooperate with another device or component to perform the operations.

To enable user interaction with the computing device 1100, an input device 1190 represents any number of input mechanisms, such as a microphone for speech, a touch-sensitive screen for gesture or graphical input, keyboard, mouse, motion input, scroll wheel, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic hardware depicted can easily be substituted for improved hardware or firmware arrangements as they are developed.

One or more parts of the example computing device 1100, up to and including the entire computing device 1100, can be virtualized. For example, a virtual processor can be a software object that executes according to a particular instruction set, even when a physical processor of the same type as the virtual processor is unavailable.

Figure 13:
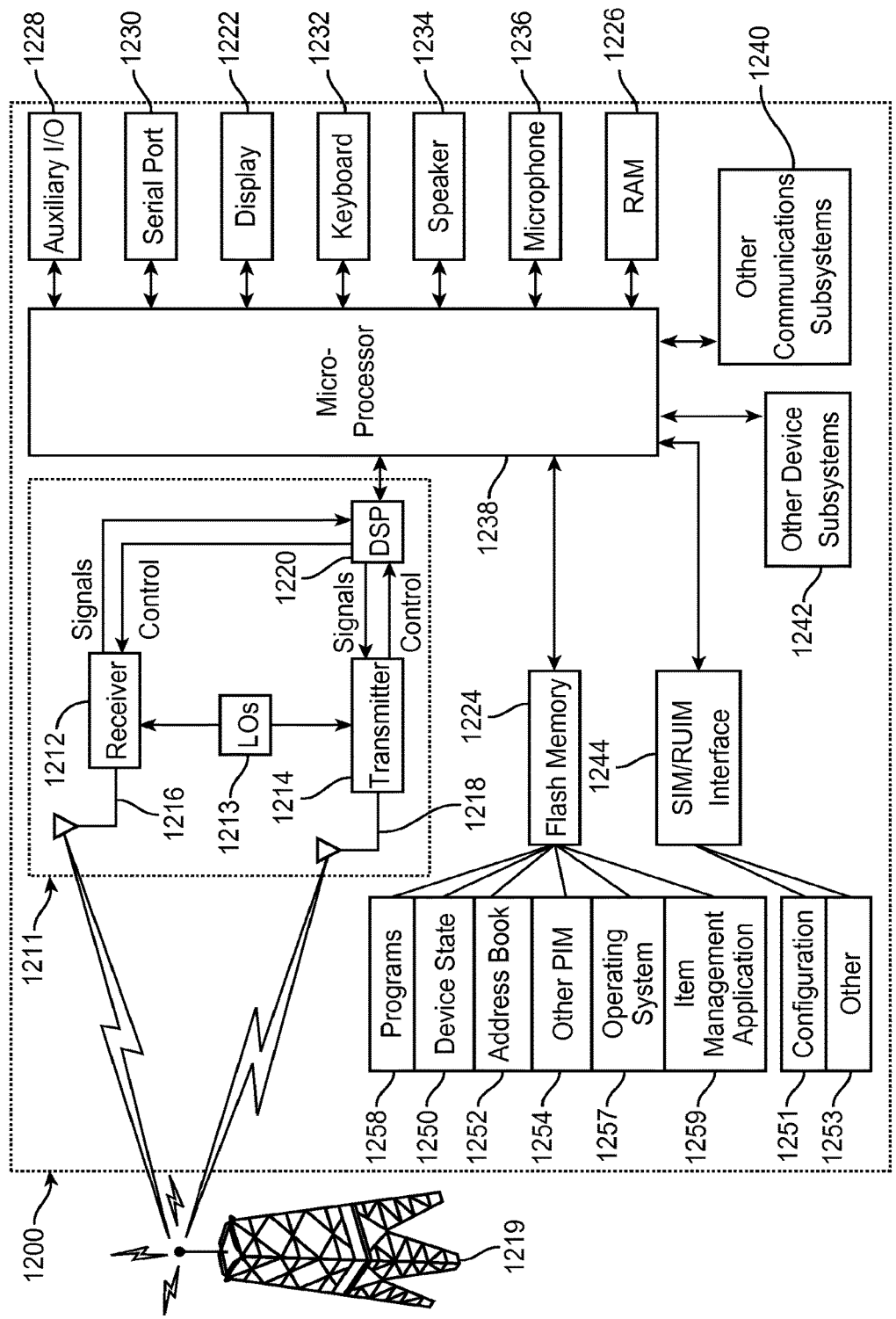
FIG. 13 is a block diagram of an electronic device in accordance with an example implementation is illustrated.

FIG. 13 is a block diagram illustrating an electronic device for controlling a fluidic temperature control device. Electronic device 1200 can include fluidic temperature control device 105, a sous-vide cooker, components of a sous-vide cooker, an electronic device used to control device 105, professional electronic devices 375, and/or client electronic devices 350. Electronic device 1200 includes a microprocessor 1238 that controls the operation of the electronic device 1200. A communication subsystem 1211 performs communication transmission and reception with the wireless network 1219. The microprocessor 1238 can be communicatively coupled with an auxiliary input/output (I/O) subsystem 1228 and/or to a serial port (for example, a Universal Serial Bus port) 1230 which can allow for communication with other devices or systems. A display 1222 can be communicatively coupled to microprocessor 1238 to allow for displaying of information to a user of the electronic device 1200. The electronic device 1200 can include a keyboard, 1231, speaker 1234, a microphone, 1236, random access memory (RAM) 1226, and flash memory 1224, all of which can be communicatively coupled to the microprocessor 1238. Other similar components can be provided on the electronic device 1200 as well and optionally communicatively coupled to the microprocessor 1238. Other communication subsystems 1240 and other electronic device subsystems 1242 can be communicatively coupled with the microprocessor 1238. For example, a short range communication system such as BLUETOOTH® communication module or a WI-FI® communication module (a communication module in compliance with IEEE 802.11b). Microprocessor 1238 is configured to perform operating system functions and enables execution of programs on the electronic device 1200. In some implementations not all of the above components can be included in the electronic device 1200. For example, in at least one implementation, the keyboard 1232 is not provided as a separate component and is instead integrated with a touchscreen as described below.

Electronic device 1200 can be equipped with components to enable operation of various programs. In at least one embodiment, flash memory 1224 is enabled to provide a storage location for the operating system 1257, device programs 1258, Address book 1252, PIM 1254 and item management application 1259. The operating system 1257 is generally configured to manage programs 1258 that are also stored in memory 1224 and executable on the microprocessor 1238. The operating system 1257 is configured to service requests made by programs 1258 through predefined program 1258 interfaces. More specifically, the operating system 1257 typically determines the order in which multiple programs 1258 are executed on the microprocessor 1238 and the execution time allotted for each program 1258, manages the sharing of memory 1224 among multiple programs 1258, handles input and output to and from other device subsystems 1242. In addition, users can typically interact directly with the operating system 1257 through a user interface shown on display screen 1222. In at least one embodiment, the operating system 1257 is stored in flash memory 1224; the operating system 1257 in other implementations is stored in read-only memory (ROM) or similar storage element (not shown). As those skilled in the art will appreciate, the operating system 1257, device program 1258 or parts thereof can be loaded in RAM 1226 or other volatile memory.

Electronic device 1200 can be enabled for two-way communication within the wireless communication network 1219. The electronic device 1200 can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 1200 can use a unique identifier to enable the electronic device 1200 to transmit and receive signals from the communication network 1219. Other systems can operate without such identifying information. GPRS, UMTS, and EDGE use a smart card such as a Subscriber Identity Module (SIM) in order to allow communication with the communication network 1219. Likewise, most CDMA systems use a Removable User Identity Module (RUIM) in order to communicate with the CDMA network. A smart card can be used in multiple different electronic devices 1200. The electronic device 1200 can perform some operations without a smart card, but the electronic device 1200 cannot be able to communicate with the network 1219. A smart card interface 1244 located within the electronic device 1200 can enable the removal or insertion of a smart card (not shown). The smart card features memory and holds key configurations 1251, and other information 1253 such as identification and subscriber related information.

Electronic device 1200 can be enabled to both transmit and receive information from the communication network 1219. In order to enable communication with the network 1219, the electronic device 1200 can be equipped with an integral or internal antenna 1218 for transmitting signals to the communication network 1219. Electronic device 1200 can be equipped with antenna 1216 for receiving communication from the communication network 1219. Antennas (1216, 1218) in another embodiment can be combined into a single antenna. As one skilled in the art would appreciate, the antenna or antennae (1216, 1218) in another implementation are externally mounted on the electronic device 1200.

Communication subsystem 1211 can be configured to support the operational needs of the electronic device 1200. The subsystem 1211 includes a transmitter 1214 and receiver 1212 including the associated antenna or antennae (1216, 1218) as described above, local oscillators (LOs) 1213, and a processing module 1220 for example a digital signal processor (DSP).

Communication between the electronic device 1200 and wireless network 1219 can be any type of communication that both the wireless network 1219 and electronic device 1200 are enabled to transmit, receive and process. In general, the communication can be classified as voice and data. Voice communication generally refers to communication in which signals for audible sounds are transmitted by the electronic device 1200 through the communication network 1219. Data generally refers to all other types of communication that the electronic device 1200 is capable of performing within the constraints of the wireless network 1219.

The keyboard 1232 can include a plurality of keys that can be physical buttons or the plurality of keys can be of a software nature, typically constituted by virtual representations of physical keys on the display screen 1222 (referred to herein as "virtual keys"). The user input can be provided as a combination of the two types of keys. Each key of the plurality of keys can have at least one action which can be the input of indicia such as a character, a command or a function. "Characters" are contemplated to exemplarily include alphabetic letters, language symbols, numbers, punctuation, insignias, icons, pictures, and even a blank space.

In the case of virtual keys, the indicia for the respective keys are shown on the display screen 1222, which in one implementation is enabled by touching the display screen 1222, for example, with a stylus, finger, or other pointer, to generate the character or activate the indicated command or function. Some examples of display screens 1222 capable of detecting a touch include resistive, capacitive, projected capacitive, infrared and surface acoustic wave (SAW) touchscreens.

Physical and virtual keys can be combined in many different ways as appreciated by those skilled in the art. In one implementation, physical and virtual keys are combined such that the plurality of enabled keys for a particular program or feature of the electronic device 1200 is shown on the display screen 1222 in the same configuration as the physical keys. Using the configuration just described, the operator can select the appropriate physical key corresponding to what is shown on the display screen 1222. Thus, the desired character, command or function is obtained by depressing the physical key corresponding to the character, command or function displayed at a corresponding position on the display screen 1222, rather than touching the display screen 1222.

While the above description generally describes the systems and components associated with a handheld electronic device, the electronic device 1200 could be another electronic device such as a PDA, a laptop computer, desktop computer, a server, or other electronic device. The electronic device 1200 can comprise different components or the above system might be omitted in order to provide the desired electronic device 1200. Additionally, other components not described above can be used to allow the electronic device 1200 to function in a desired fashion. The above description provides only general components and additional components can be used to enable the system to function. The additional systems and components would be appreciated by those of ordinary skill in the art The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

What is claimed is:

1. A sous-vide circulator cooker comprising:
a head portion comprising a display;
a middle portion extending along a longitudinal axis from the head portion and having a pump motor therein; and
a lower portion extending along the longitudinal axis from the middle portion, with the middle portion between the head portion and the lower portion, the lower portion comprising:
a skirt having a proximal end attached to the middle portion and a distal end located remotely along the longitudinal axis from the middle portion, the skirt having one or more liquid intake openings passing therethrough,
a heating element located within the skirt,
a pump housing attached at the distal end of the skirt with the heating element between the pump housing and the middle portion, the pump housing having an outlet opening passing therethrough, wherein the outlet opening is oriented away from the longitudinal axis, and the pump housing is rotatable about the longitudinal axis to a plurality of different positions relative to one or more other portions of the sous-vide circulator cooker, and
a pump impeller rotatably mounted within the pump housing and operatively connected to the pump motor, the pump impeller being configured to selectively generate a flow of liquid from the one or more liquid intake openings, past the heating element, into the pump housing, and out through the outlet opening, when the pump housing is in the plurality of different positions.

2. The sous-vide circulator of claim 1, wherein the skirt comprises stainless steel.

3. The sous-vide circulator of claim 1, wherein the lower portion is removable from middle portion.

4. The sous-vide circulator of claim 1, wherein the pump housing is removable from the skirt.

5. The sous-vide circulator of claim 1, wherein the outlet opening extends through a side of the pump housing and is oriented perpendicular to the longitudinal axis.

6. The sous-vide circulator of claim 1, wherein the pump housing is rotatable about the longitudinal axis relative to the middle portion to position the outlet opening at different orientations relative to the middle portion.

7. The sous-vide circulator of claim 1, wherein the skirt is rotatable about the longitudinal axis relative to the middle portion to position the outlet opening at different orientations relative to the middle portion.

8. The sous-vide circulator of claim 1, wherein the outlet opening extends through an end of the pump housing along the longitudinal axis.

9. The sous-vide circulator of claim 1, wherein the pump impeller is operatively connected to the pump motor by a pump motor shaft.

10. The sous-vide circulator of claim 9, wherein the heating element comprises a coil and the pump motor shaft passes through the coil.

11. The sous-vide circulator of claim 1, wherein the heating element comprises a coil located within the skirt, and the one or more liquid intake openings surround the coil.

12. The sous-vide circulator of claim 11, wherein the coil and the one or more liquid intake openings are adjacent the distal end of the skirt.

13. The sous-vide circulator of claim 1, further comprising a clamp extending laterally from the middle portion and configured to secure the sous-vide circulator to a container.

14. The sous-vide circulator of claim 1, wherein the head portion is rotatable relative to the clamp.

15. The sous-vide circulator of claim 1, further comprising a steam evacuation fan located in the middle portion.

16. The sous-vide circulator of claim 1, wherein the middle portion comprises one or more ventilation openings.

17. The sous-vide circulator of claim 16, wherein the one or more ventilation openings surround the pump motor.

18. The sous-vide circulator of claim 1, wherein the display is configured to indicate a temperature of a fluid in which the sous-vide circulator is at least partially immersed.

19. The sous-vide circulator of claim 1, wherein the head portion comprises an input device configured to receive user input.

20. The sous-vide circulator of claim 1, wherein the head portion extends from a relatively narrow cylindrical neck portion to a relatively wide flared upper end, the display being located on the flared upper end.

21. The sous-vide circulator of claim 20, further comprising a scroll wheel input, the scroll wheel input being located on the cylindrical neck portion and oriented to rotate about an axis that is perpendicular to the cylindrical neck portion.

22. The sous-vide circulator of claim 13, wherein the pump housing is rotatable about the longitudinal axis relative to the clamp to position the outlet opening at different orientations relative to the clamp.

23. The sous-vide circulator of claim 1, wherein the pump housing is rotatable about the longitudinal axis through an infinite range of positions relative to one or more other portions of the sous-vide circulator cooker.

24. The sous-vide circulator of claim 1, wherein the pump housing is rotatable about the longitudinal axis through full circle of movement relative to one or more other portions of the sous-vide circulator cooker.

* * * * *